(12) United States Patent
Charisius et al.

(10) Patent No.: US 7,188,332 B2
(45) Date of Patent: Mar. 6, 2007

(54) METHODS AND SYSTEMS FOR RELATING A DATA DEFINITION FILE AND A DATA MODEL FOR DISTRIBUTED COMPUTING

(75) Inventors: Dietrich Charisius, Stuttgart (DE); Alexander Aptus, Esslingen (DE)

(73) Assignee: Borland Software Corporation, Cupertino, CA (US)

( * ) Notice: Subject to any disclaimer, the term of this patent is extended or adjusted under 35 U.S.C. 154(b) by 741 days.

(21) Appl. No.: 09/839,524

(22) Filed: Apr. 20, 2001

(65) Prior Publication Data

US 2002/0108101 A1 Aug. 8, 2002

Related U.S. Application Data

(63) Continuation-in-part of application No. 09/680,063, filed on Oct. 4, 2000, now Pat. No. 6,851,107.

(60) Provisional application No. 60/199,046, filed on Apr. 21, 2000, provisional application No. 60/157,826, filed on Oct. 5, 1999.

(51) Int. Cl.
*G06F 9/44* (2006.01)
(52) U.S. Cl. ................................ 717/104; 717/105
(58) Field of Classification Search ................ 717/104, 717/105
See application file for complete search history.

(56) References Cited

U.S. PATENT DOCUMENTS

| | | | | |
|---|---|---|---|---|
| 5,689,711 | A * | 11/1997 | Bardasz et al. | 717/105 |
| 5,838,973 | A * | 11/1998 | Carpenter-Smith et al. | 717/105 |
| 6,018,627 | A * | 1/2000 | Iyengar et al. | 717/104 |
| 6,038,393 | A * | 3/2000 | Iyengar et al. | 717/104 |
| 6,105,022 | A * | 8/2000 | Takahashi et al. | 707/3 |
| 6,167,564 | A * | 12/2000 | Fontana et al. | 717/104 |
| 6,199,195 | B1 * | 3/2001 | Goodwin et al. | 717/104 |
| 6,314,434 | B1 * | 11/2001 | Shigemi et al. | 707/203 |
| 6,356,920 | B1 * | 3/2002 | Vandersluis | 715/501.1 |
| 6,381,743 | B1 * | 4/2002 | Mutschler, III | 717/104 |
| 6,480,860 | B1 * | 11/2002 | Monday | 717/116 |
| 6,550,054 | B1 * | 4/2003 | Stefaniak | 717/104 |

FOREIGN PATENT DOCUMENTS

| | | |
|---|---|---|
| EP | 1 030 242 A2 | 8/2000 |
| EP | 1 030 252 A1 | 8/2000 |

OTHER PUBLICATIONS

Messa et al., "Visual Software Development Using An Object-Relationship Model", 1999, ACM, p. 1-7.*

(Continued)

*Primary Examiner*—Wei Zhen
*Assistant Examiner*—Qamrun Nahar
(74) *Attorney, Agent, or Firm*—MacCord Mason PLLC

(57) ABSTRACT

Methods and systems consistent with the present invention provide an improved software development tool which allows a developer to visually depict an existing data definition file containing data elements and relationships between the data elements by generating an XML structure diagram from the existing data definition file. Using methods and systems consistent with the present invention, the improved software development tool also allows the developer to generate a data definition file from an existing XML structure diagram.

33 Claims, 33 Drawing Sheets

OTHER PUBLICATIONS

James Martin, "Principles of Object-Oriented Analysis and Design," Prentice Hall, Oct. 29, 1992, Chapters 1-22.

M.M. Burnett, et al., "Visual Object-Oriented Programming Concepts and Environments," Manning Publishing, 1994, Chapters 1-12.

Erich Gamma, et al., "Design Patterns Elements of Reusable Object-Oriented Software," Addison-Wesley, 1994, Chapter 1.

Wayne Citrin, et al., "A Formal Definition of Control Semantics in a Completely Visual Language," Sep. 1993, Mac World.

RR Software Inc., "JANUS/ADA 95 Compiler User Manual," Version 5.1 Dec. 1995, pp. 6-1 to 6-48.

F. Penz, "Visual Programming in the ObjectWorld," Journal of Visual Languages and Computing, Mar. 1991, vol. 2, p. 17-41.

L. Vanhelsuwe, "Mastering JAVABEANS," Sybex, Chapter 2.

David Withey McIntrye, "A Visual Method for Generating Iconic Programming Environments," UMI Dissertation Services.

* cited by examiner

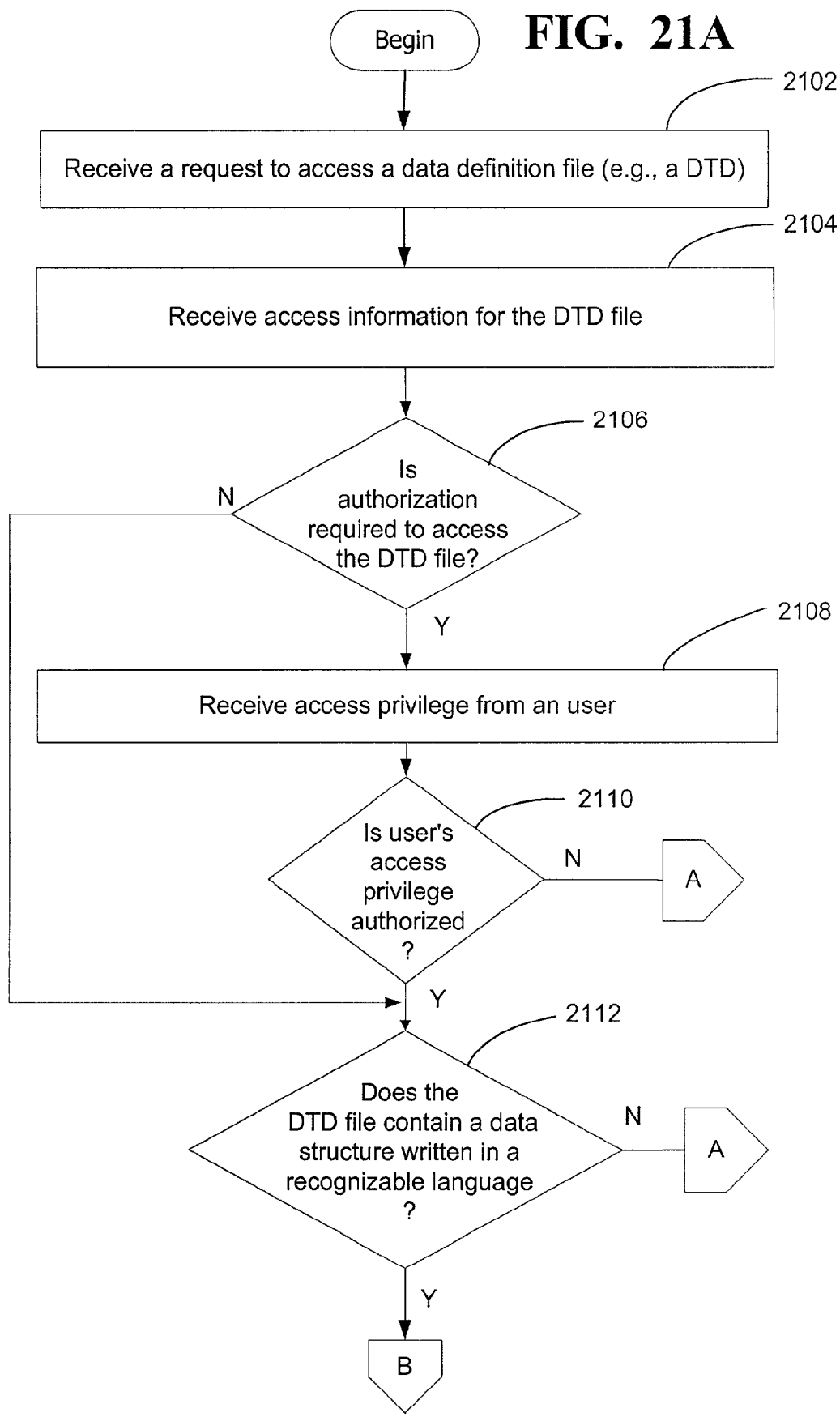

```
<?xml version="1.0" encoding="ASCII"?>
<!-- Generated by Together -->                    2403
<!-- Processing instructions -->
<!-- Attribute entities -->
<!-- Reusable attribute is presented as an entity -->
<!ENTITY % comment "comment CDATA #IMPLIED " >
<!ENTITY % job_description "job_description CDATA #IMPLIED " >
<!-- Attribute group entities -->
<!-- Attribute groups are also presented as entity parameters-->
<!ENTITY % name "first_name CDATA 'ivan' last_name CDATA #REQUIRED
second_name CDATA #IMPLIED " >
<!-- Model group entities -->
<!-- Model groups are presented as entity parameters as well -->
<!ENTITY % xmlModelGroup1 "hierarchy? , url* , personal , email* " >
                                                                       2414
<!-- Elements -->
<!-- This is an element whose content is described in the Model Group 1 -->
<!ELEMENT employee ( %xmlModelGroup1; ) >
                                            2404
             2406
<!-- Here are the sttributes of this element -->
<!ATTLIST employee identifier CDATA #REQUIRED >
                                                    2408
              2410
<!ELEMENT chief_executive ( %xmlModelGroup1; ) >
<!ATTLIST chief_executive identifier CDATA #REQUIRED > 2418
<!ELEMENT url EMPTY >
<!ATTLIST url %job_description; >
<!ELEMENT email (#PCDATA) >
<!ATTLIST email address CDATA #IMPLIED %comment; >
<!ELEMENT personal (#PCDATA) >
<!-- Attribute a-dtype describes non-standard types of the other attributes -->
<!ATTLIST personal date_of_birth CDATA #REQUIRED %name; a-dtype
NMTOKENS "date_of_birth date " >
<!ELEMENT hierarchy EMPTY >
              2416
<!ATTLIST hierarchy subordinates IDREFS #IMPLIED supervisor ID #IMPLIED
%comment; position CDATA #REQUIRED >
<!ELEMENT personnel (employee* , chief_executive? ) >
                                                        2412
<!-- General entities -->
<!ENTITY Entity1 "111">
<!ENTITY Entity2 PUBLIC "e2" "e2" NDATA Notation1 >
<!ENTITY Entity3 PUBLIC "e3" "e3" NDATA Notation2 >
<!-- Notations -->
<!NOTATION Notation1 PUBLIC "n1" "n1" >
<!NOTATION Notation2 PUBLIC "n2" "n2" >
```

METHODS AND SYSTEMS FOR RELATING A DATA DEFINITION FILE AND A DATA MODEL FOR DISTRIBUTED COMPUTING

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000 now U.S. Pat. No. 6,851, 107, which claims the benefit of the filing date of U.S. Provisional Application No. 60/157,826, entitled "Visual Unified Modeling Language Development Tool," filed on Oct. 5, 1999, and U.S. Provisional Application No. 60/199, 046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

The Cross Reference to Related Applications should be amended beginning with line 22 on page 1 as follows:

U.S. patent application Ser. No. 09/839,045, entitled "Methods and Systems for Generating Source Code for Object Oriented Elements," and filed on the same date herewith;

U.S. patent application Ser. No. 09/839,526 entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/839,580, entitled "Diagrammatic Control of a Software in a Version Control System," and filed on the same date herewith;

U.S. patent application Ser. No. 09/839,578, entitled "Navigation Links in Generated Documentation," and filed on the same date herewith; and U.S. patent application Ser. No. 09/839,644, entitled "Methods and Systems for Identifying Dependencies Between Object-Oriented Elements," and filed on the same date herewith.

FIELD OF THE INVENTION

The present invention relates generally to data processing systems and, more particularly, to methods and systems for relating a data definition file and a data model for distributed computing.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the entire source code 104 is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. The software development tool is designed for use with more than one programming language.

The software development tool significantly reduces programming development time for a developer by allowing the developer to generate a data model, such as an Extensible Markup Language (XML) structure diagram, from a definition file, such as a Document Type Definition (DTD) file. The XML structure diagram produced by the software development tool provides the developer with a visual insight into the design of the data definition file so that problems with the data definition file or code using the data definition file can be corrected quickly. In addition, the software development tool saves the developer the time and effort spent manually producing a DTD file by allowing the developer to automatically generate a DTD from an XML structure diagram previously produced by the developer using the software development tool.

In accordance with methods consistent with the present invention, a method is provided in a data processing system. The method comprising the steps of receiving an identification of a data definition file having a plurality of data elements and a plurality of relationships between the data elements, each data element having a name and a definition, and generating a graphical representation that visually identifies the plurality of data elements and the plurality of relationships between the data elements contained within the data definition file.

In accordance with methods consistent with the present invention, a method is provided in a data processing system. The method comprising the steps of receiving an indication to generate a data definition file from a graphical representation having a plurality of data element diagrams and a plurality of relationships between the data element diagrams, each data element diagram having a name, and adding a plurality of data element identifiers to the data definition file that reflect the data element diagrams and the relationships between the data element diagrams.

In accordance with articles of manufacture consistent with the present invention, a computer-readable medium is provided. The computer-readable medium contains instructions for controlling a data processing system to perform a method. The method comprising the steps of receiving an identification of a data definition file having a plurality of data elements and a plurality of relationships between the data elements, each data element having a name and a definition, and generating a graphical representation that visually identifies the plurality of data elements and the plurality of relationships between the data elements contained within the data definition file.

In accordance with articles of manufacture consistent with the present invention, a computer-readable medium is provided. The computer-readable medium contains instructions for controlling a data processing system to perform a method. The method comprising the steps of receiving an indication to generate a data definition file from a graphical representation having a plurality of data element diagrams and a plurality of relationships between the data element diagrams, each data element diagram having a name, and adding a plurality of data element identifiers to the data definition file that reflect the data element diagrams and the relationships between the data element diagrams.

Additional implementations are directed to systems and computer devices incorporating the methods described above. It is also to be understood that both the foregoing general description and the detailed description to follow are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 21A–C depict a flow diagram illustrating an exemplary process performed by the software development tool to generate an Extensible Markup Language (XML) structure diagram from a data definition file used in distributed computing;

FIG. 24 depicts an exemplary data structure contained in the data definition file and used by the software development tool to form an XML structure diagram;

Figure 1:
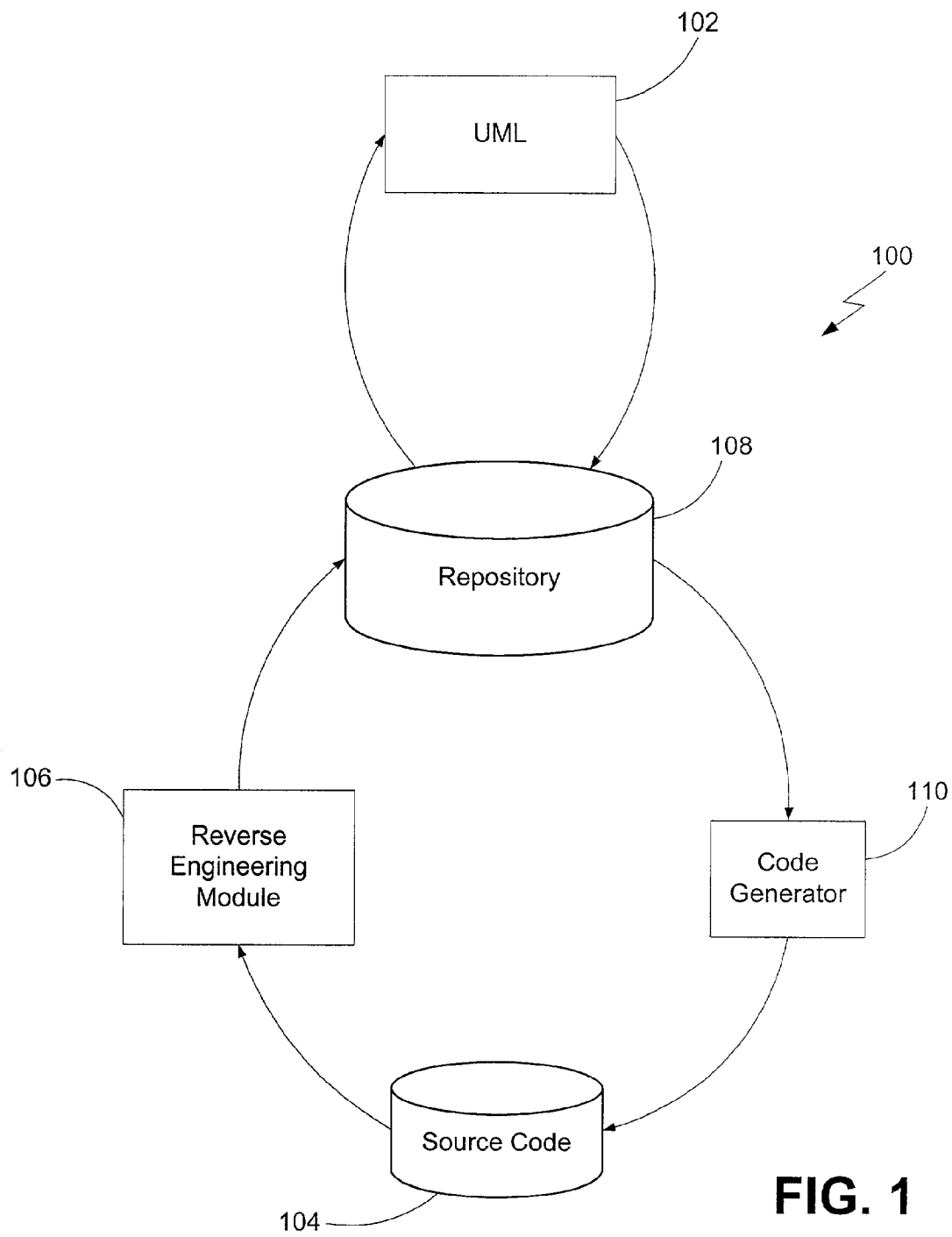
FIG. 1 depicts a conventional software development tool.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 2:
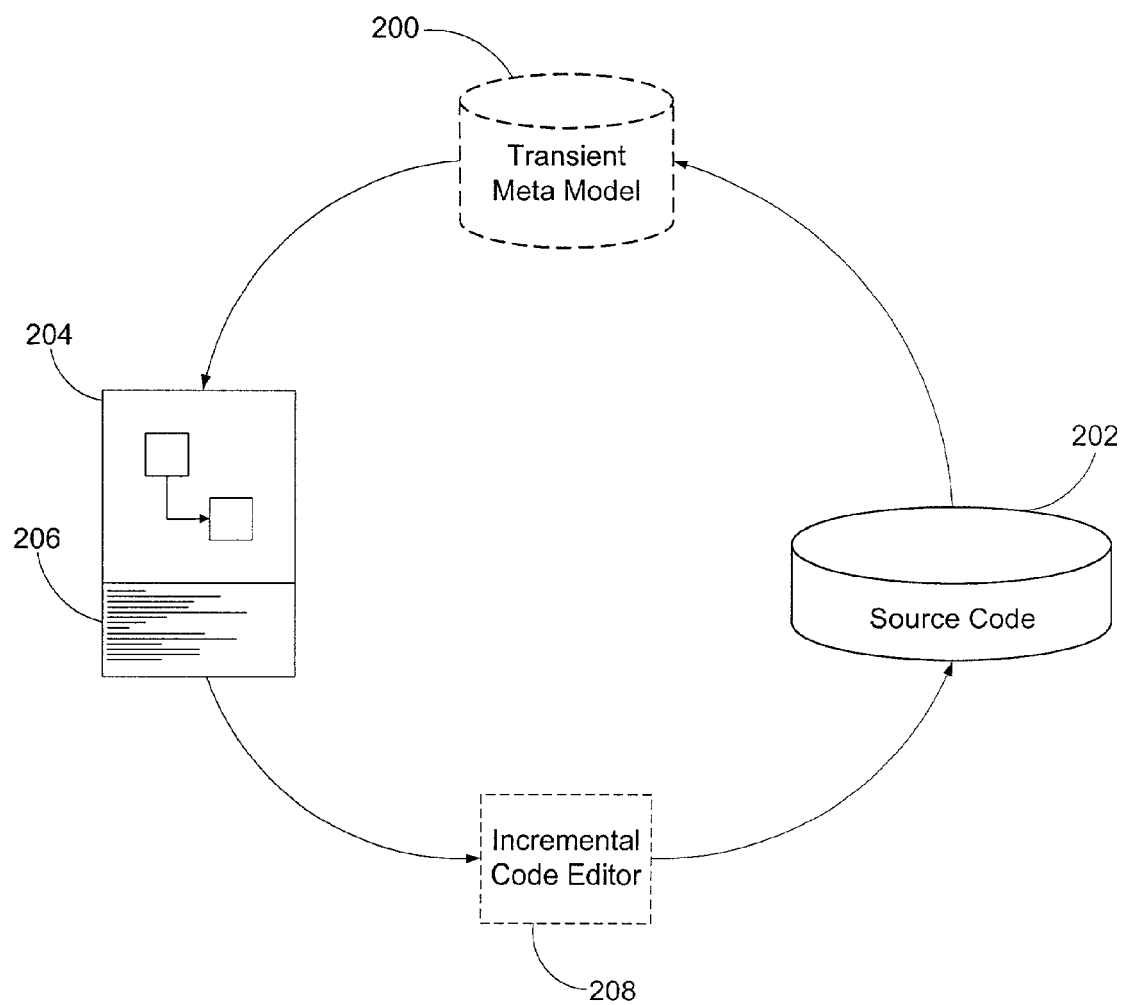
FIG. 2 depicts an overview of a software development tool in accordance with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
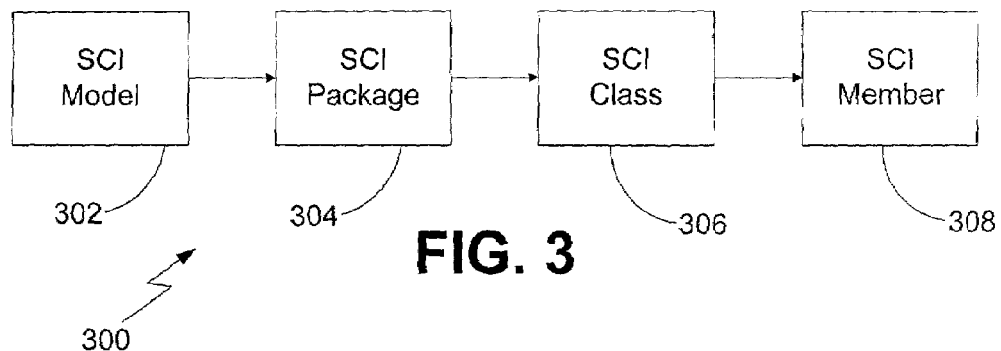
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
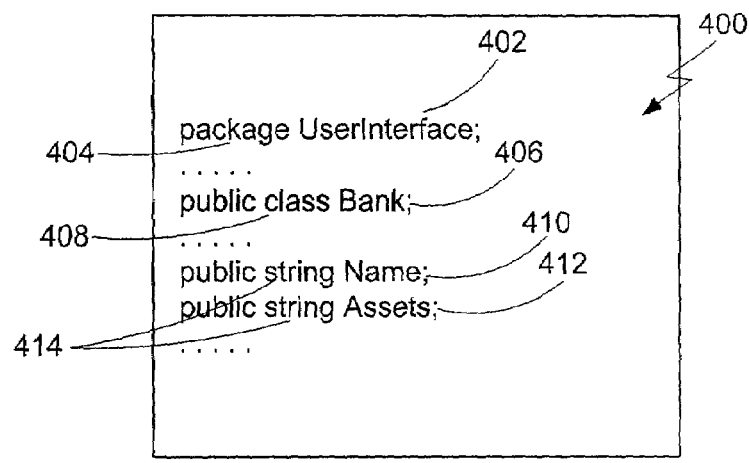
FIG. 4 depicts representative source code.
Figure 5:
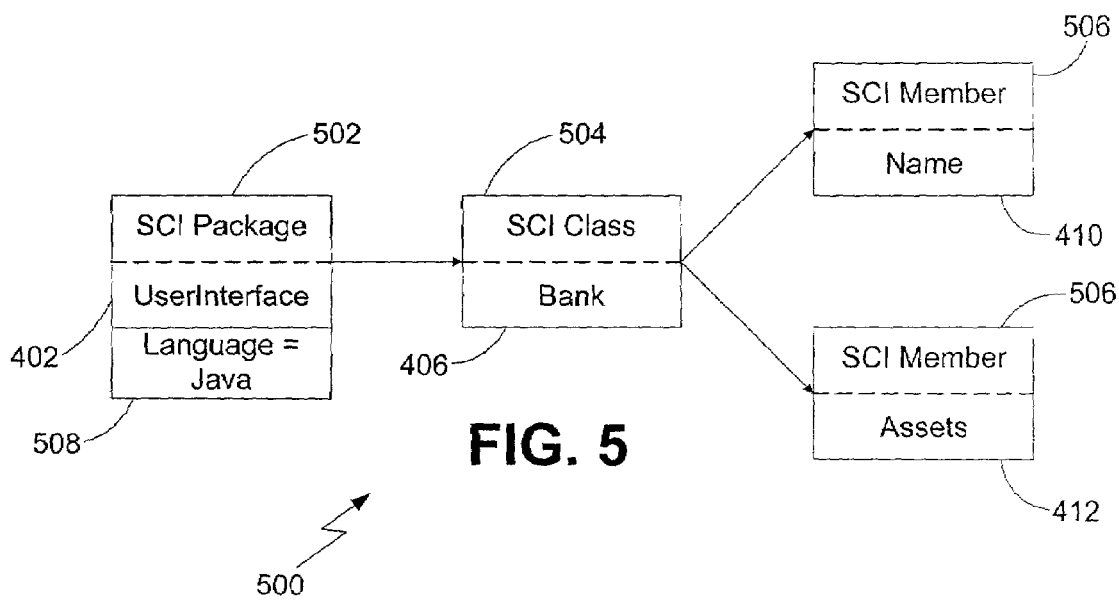
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
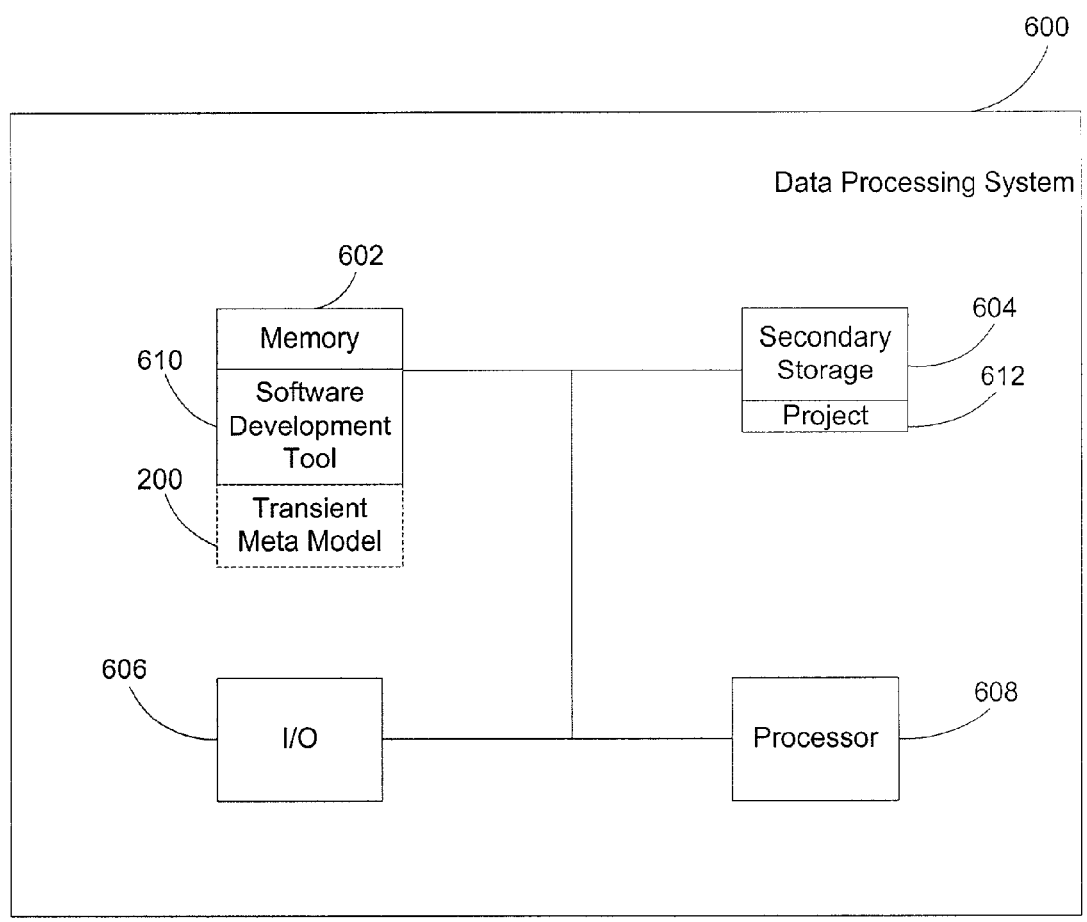
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
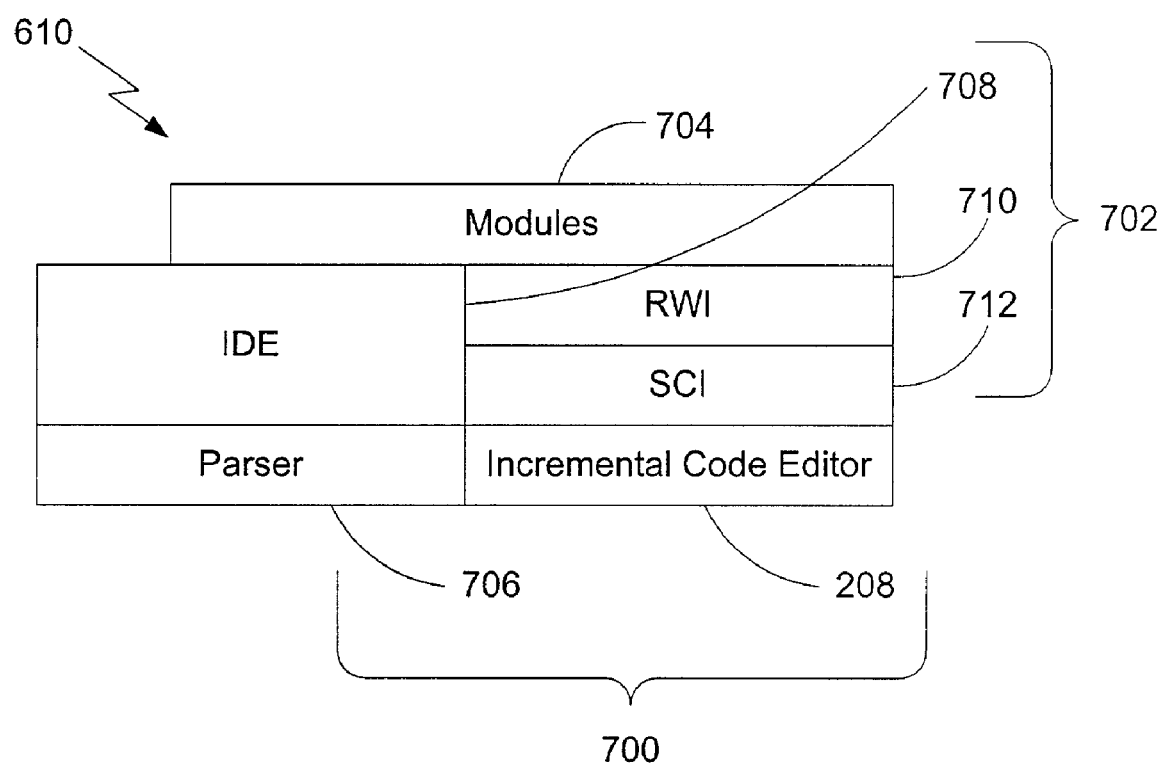
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates the complexity metrics, i.e., the measurement of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made.<br>Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators' / 'Number of Unique Operands') * ('Number of Operands' / 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |

TABLE 5-continued

Halstead Metrics

| Halstead Metrics | Description |
| --- | --- |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
| --- | --- |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
| --- | --- |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
| --- | --- |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
| --- | --- |
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
| --- | --- |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
| --- | --- |
| Avoid Hiding Inherited Attributes | Detects when attributes declared in child classes hide inherited attributes. |
| Avoid Hiding Inherited Static Methods | Detects when inherited static operations are hidden by child classes. |

TABLE 11-continued

Critical Errors Audits

| Critical Errors Audits | Description |
| --- | --- |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case.<br>Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
| --- | --- |
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize ( ) Doesn't Call super.finalize( ) | Calling of super.finalize( ) from finalize( ) is good practice of programming, even if the base class doesn't define the finalize( ) method. This makes class implementations less dependent on each other. |

TABLE 16-continued

Possible Error Audits

| Possible Error Audits | Description |
| --- | --- |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
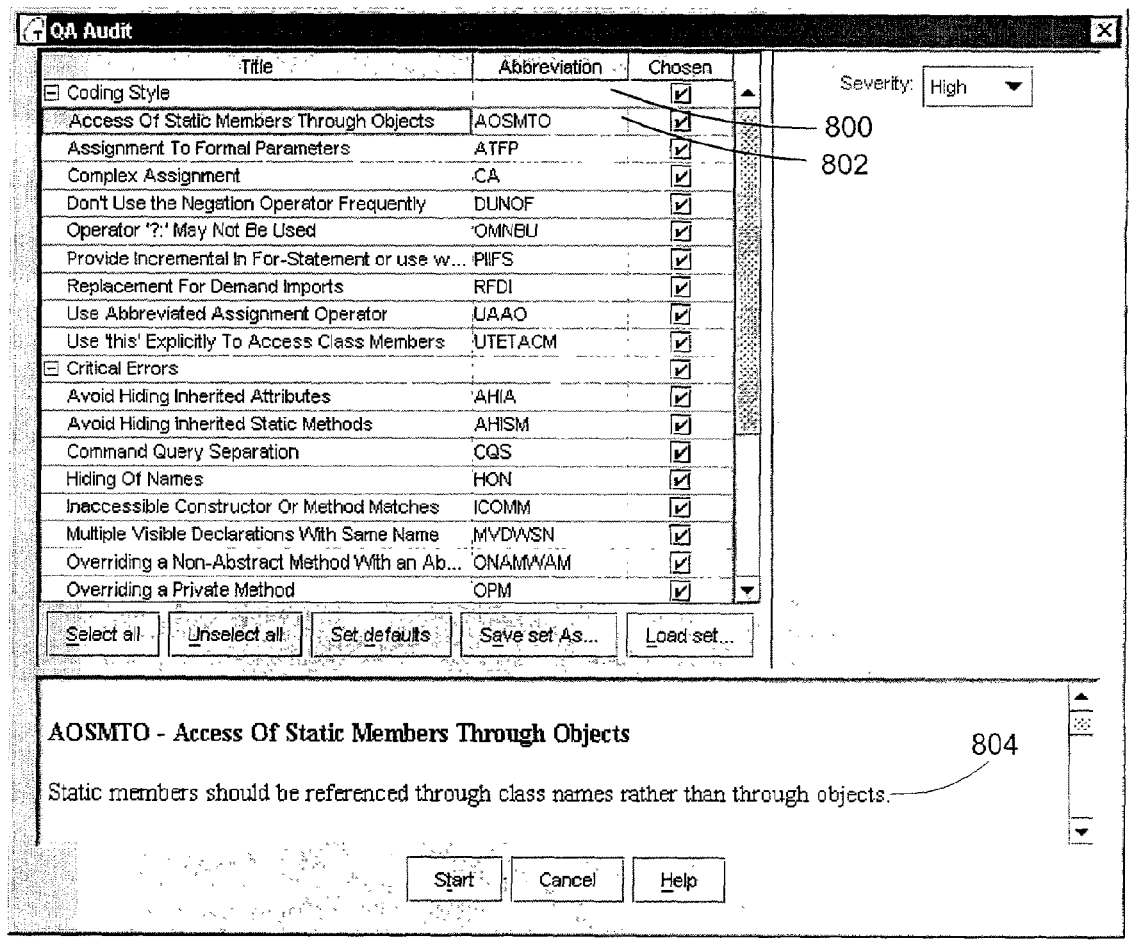
FIG. 8A depicts a user interface displayed by the software development tool depicted in FIG. 2, where the user interface displays a list of predefined criteria which the software development tool checks in the source code.
Figure 8B:
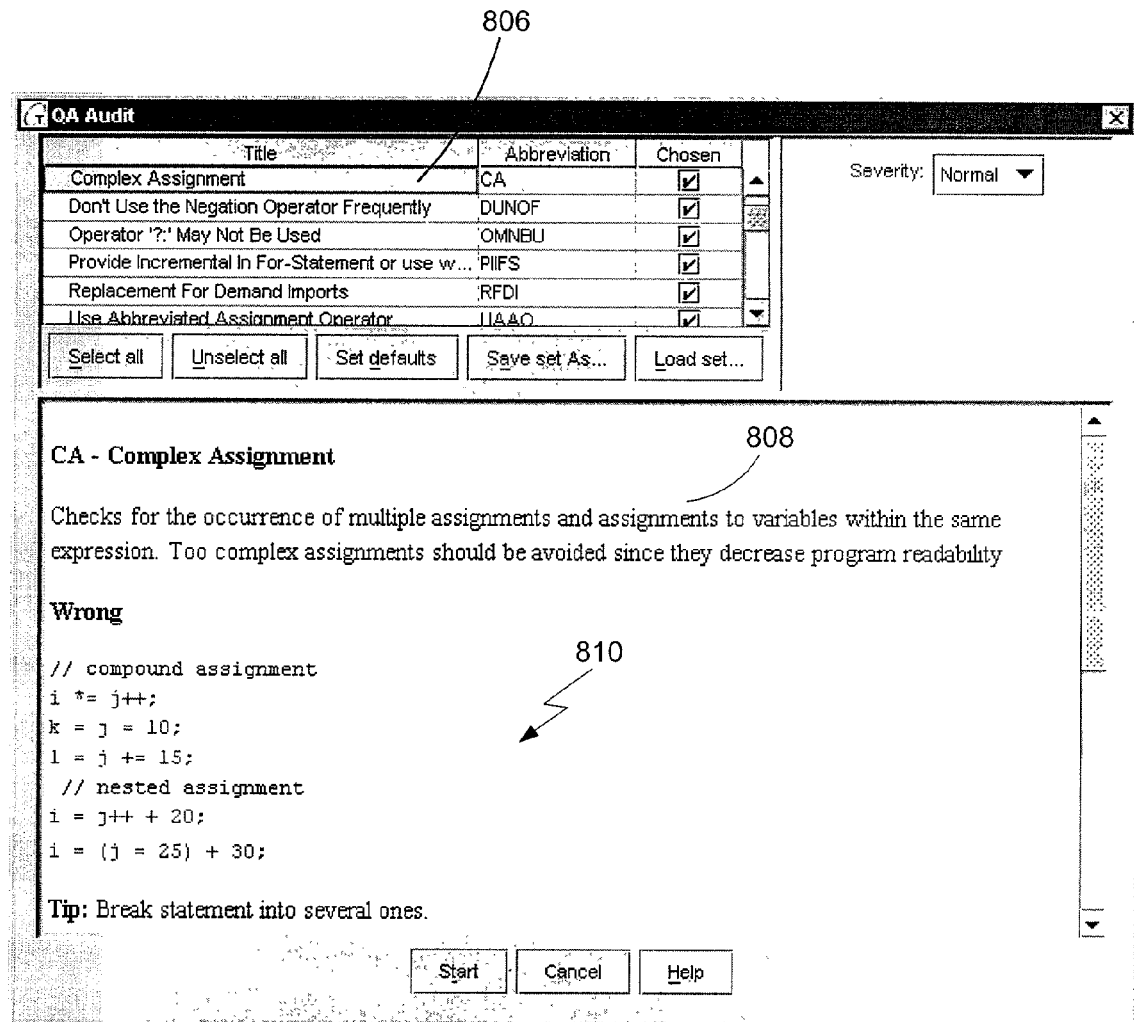
FIG. 8B depicts a user interface displayed by the software development tool depicted in FIG. 2, where the user interface displays the definition of the criteria which the software development tool checks in the source code, and an example of source code which does not conform to the criteria.
Figure 8C:
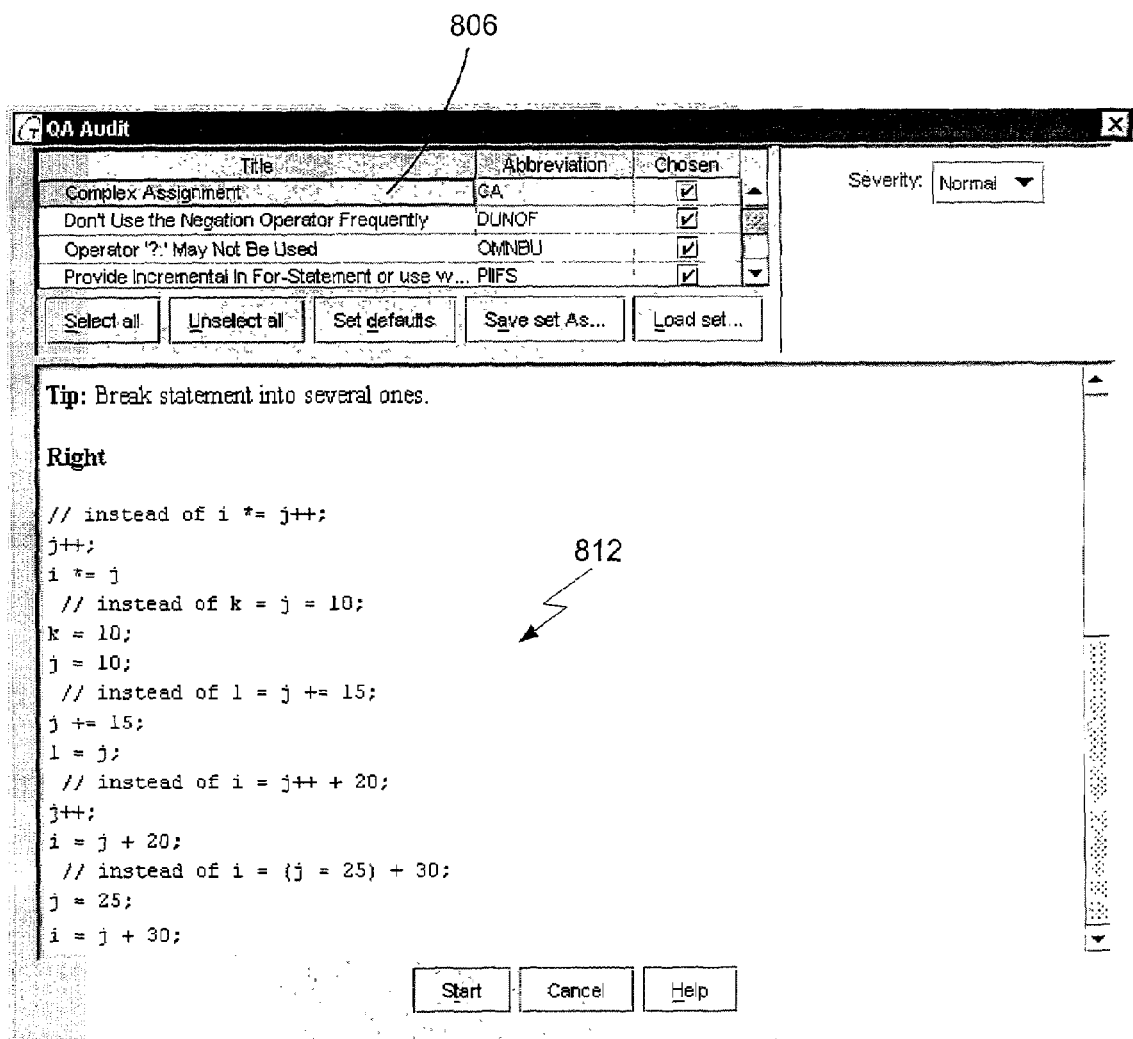
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors well known in the art, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received from the display of the source code, the display of the graphical representation of the project, or via some other independent software to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
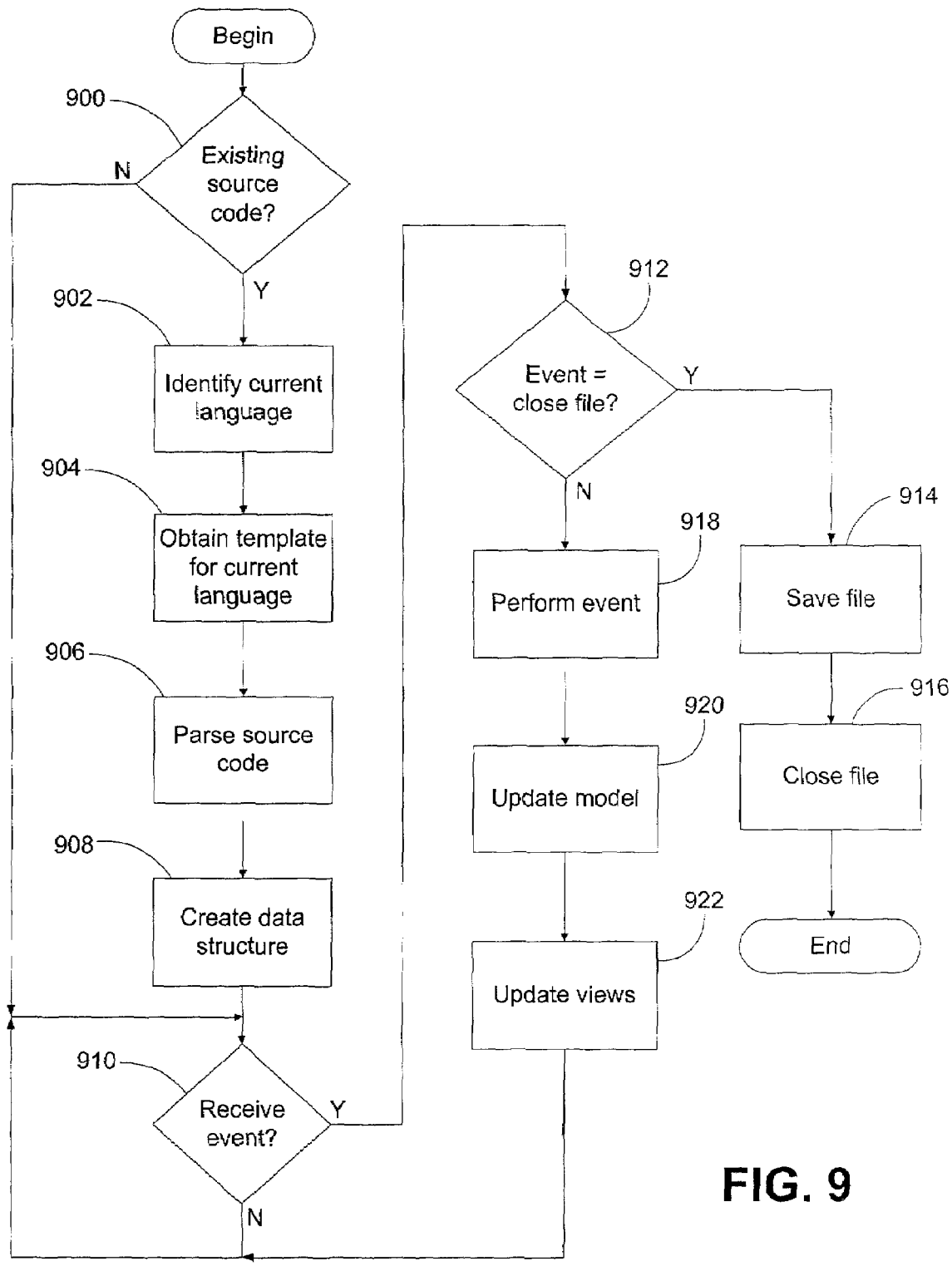
FIG. 9 depicts a flow diagram of the steps performed by the software development tool depicted in FIG. 2.

FIG. 9 depicts a flow diagram of the steps performed by the software development tool to develop a project in accordance with the present invention. As previously stated, the project comprises a plurality of files. The developer either uses the software development tool to open a file which contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the definition of a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
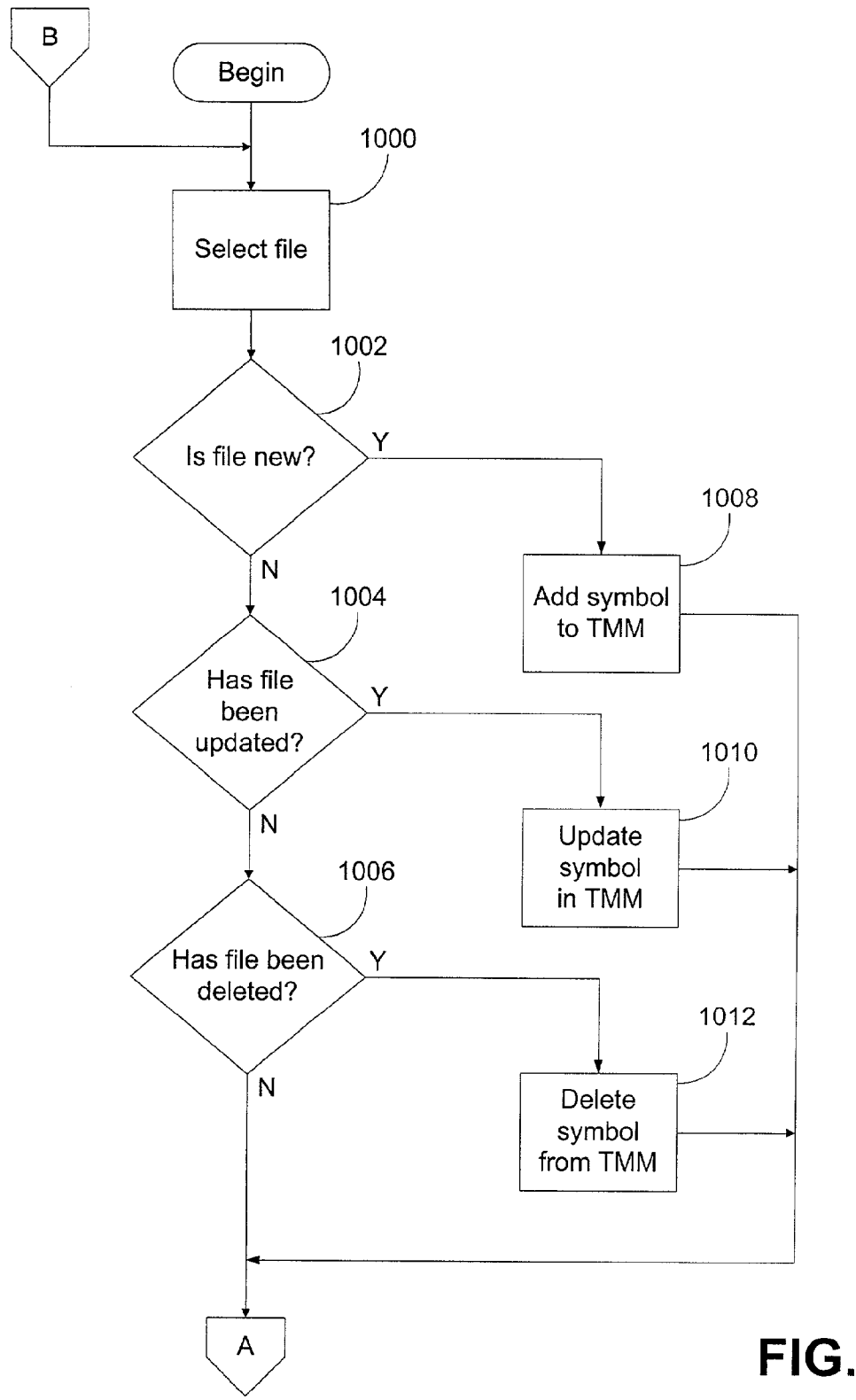
FIGS. 10A and 10B depict a flow diagram illustrating the update model step of FIG. 9.
Figure 10B:
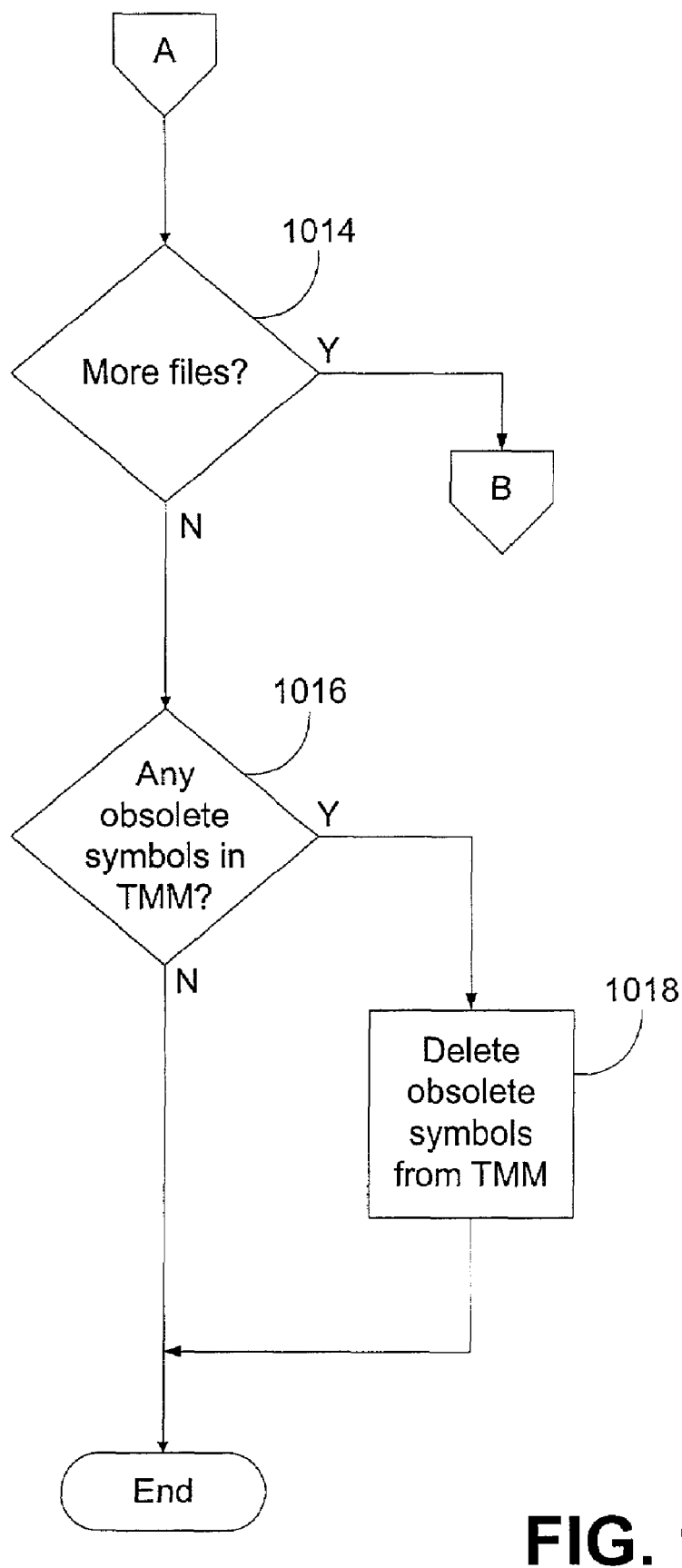

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
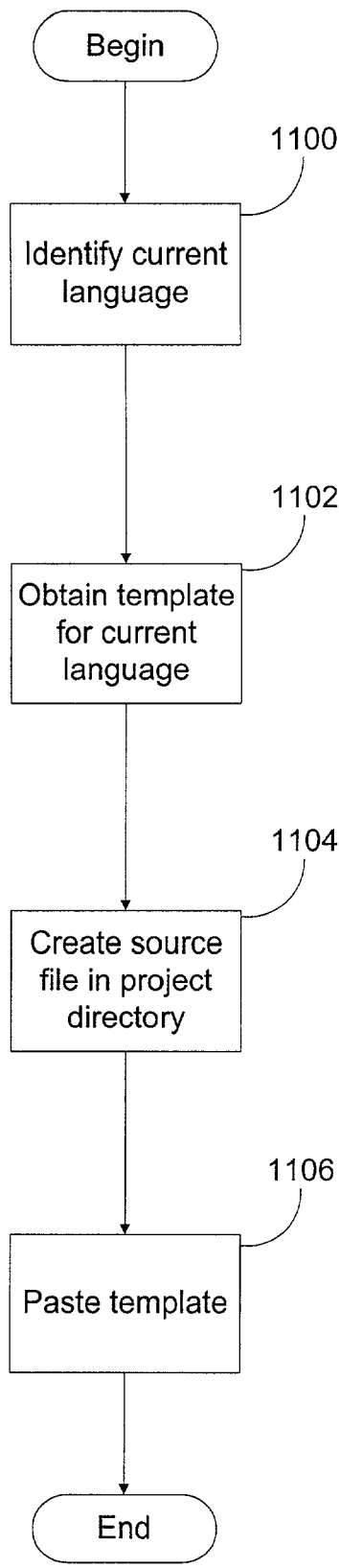
FIG. 11 depicts a flow diagram of the steps performed by the software development tool in FIG. 2 when creating a class.

FIG. 11 depicts a flow diagram illustrating the performance of an event, specifically the creation of a class, in accordance with the present invention. After identifying the programming language (step 1100), the software development tool obtains a template for the language (step 1102), creates a source code file in the project directory (step 1104), and pastes the template onto the TMM (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
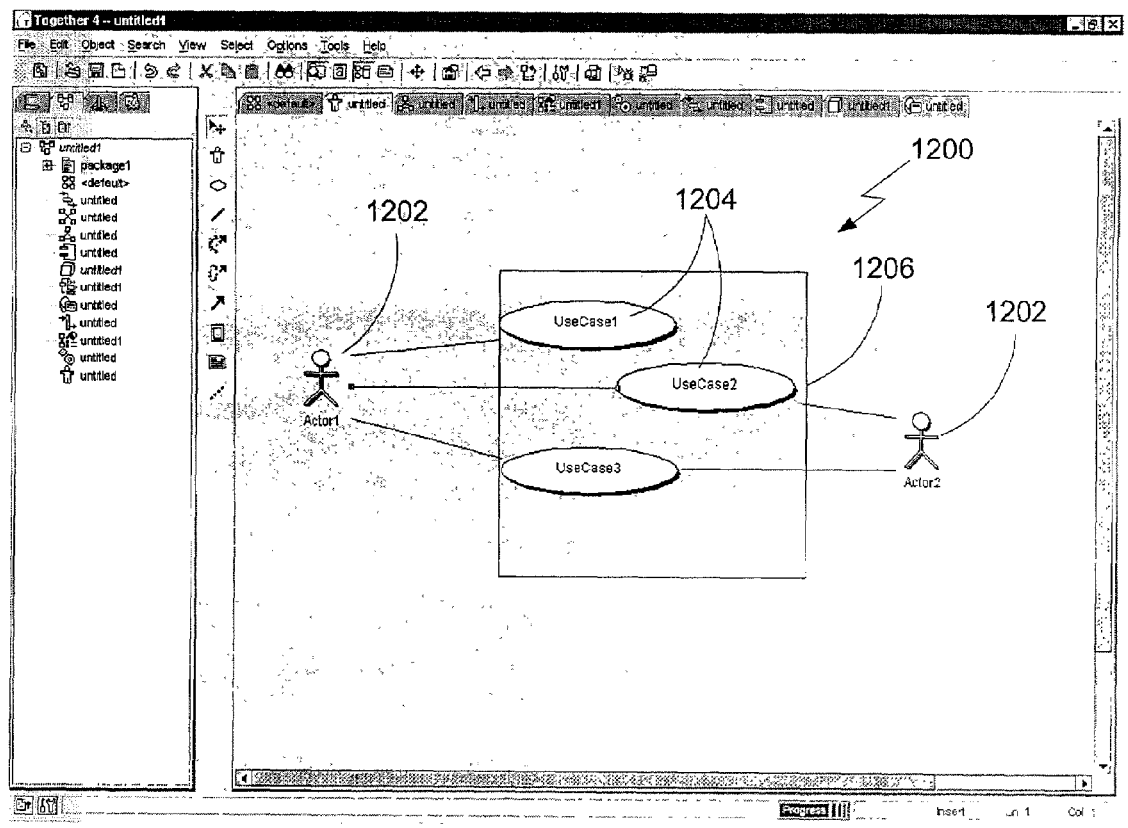
FIG. 12 depicts a user interface displayed by the software development tool depicted in FIG. 2, where the user interface displays a use case diagram of source code.
Figure 13:
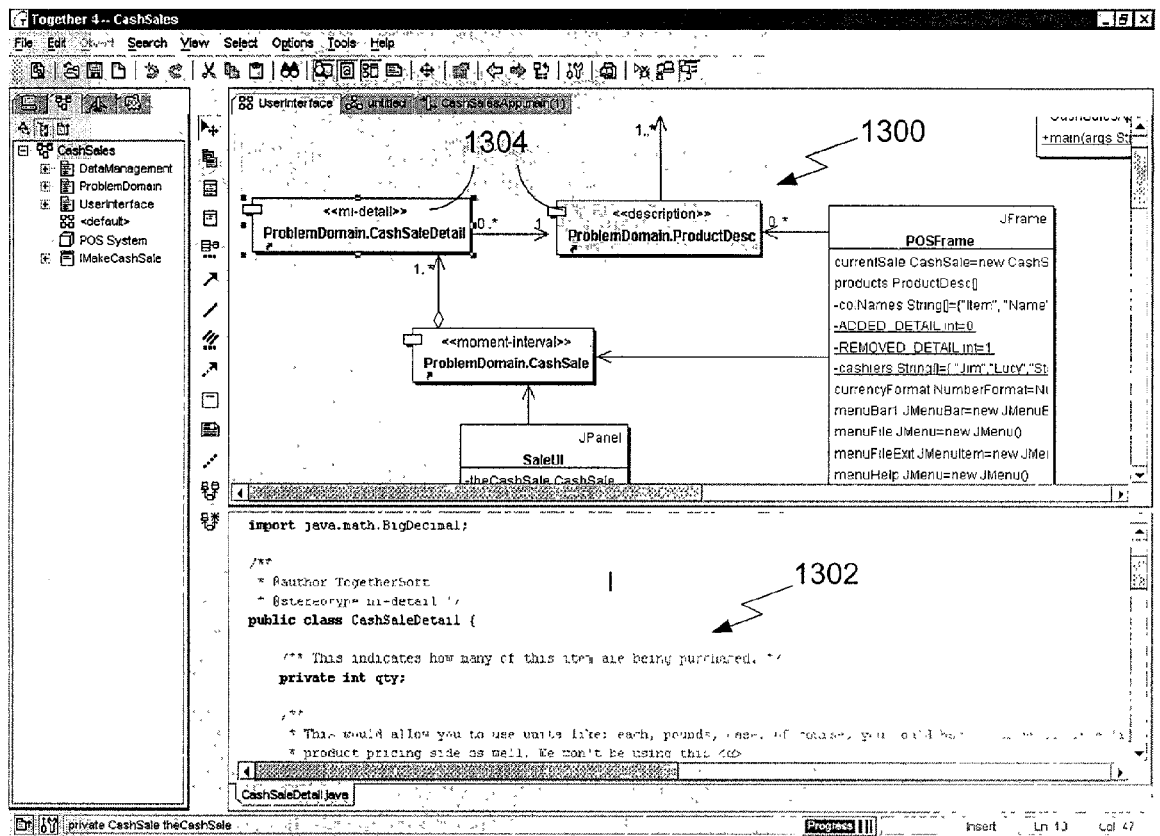
FIG. 13 depicts a user interface displayed by the software development tool depicted in FIG. 2, where the user interface displays both a class diagram and a textual view of source code.

The software development tool is collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
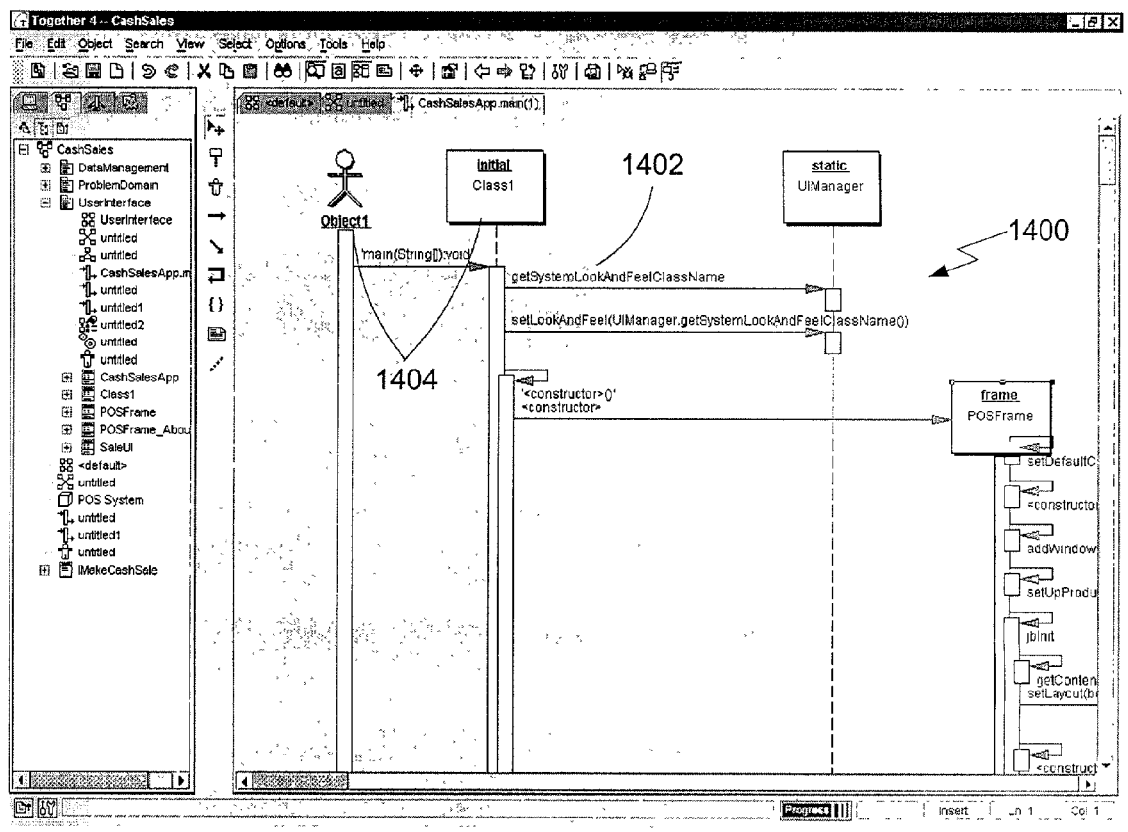
FIG. 14 depicts a user interface displayed by the software development tool depicted in FIG. 2, where the user interface displays a sequence diagram of source code.
Figure 15:
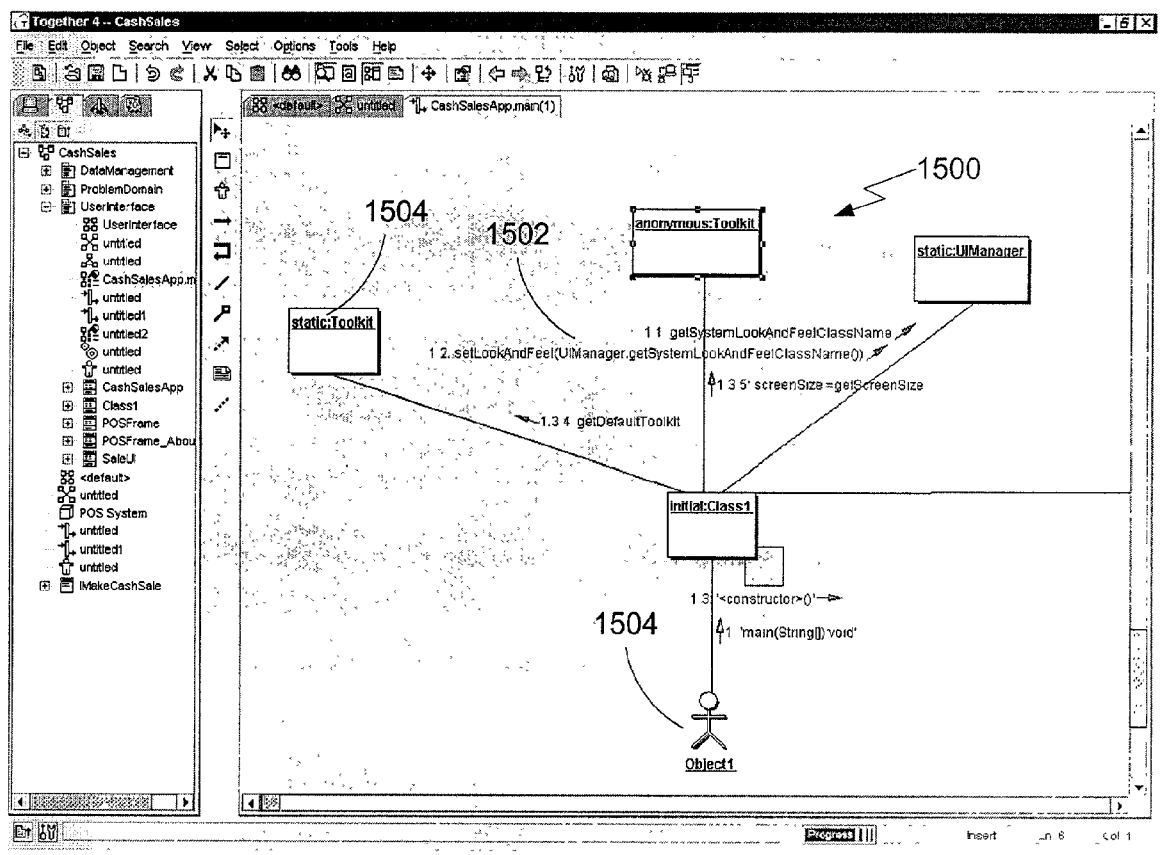
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
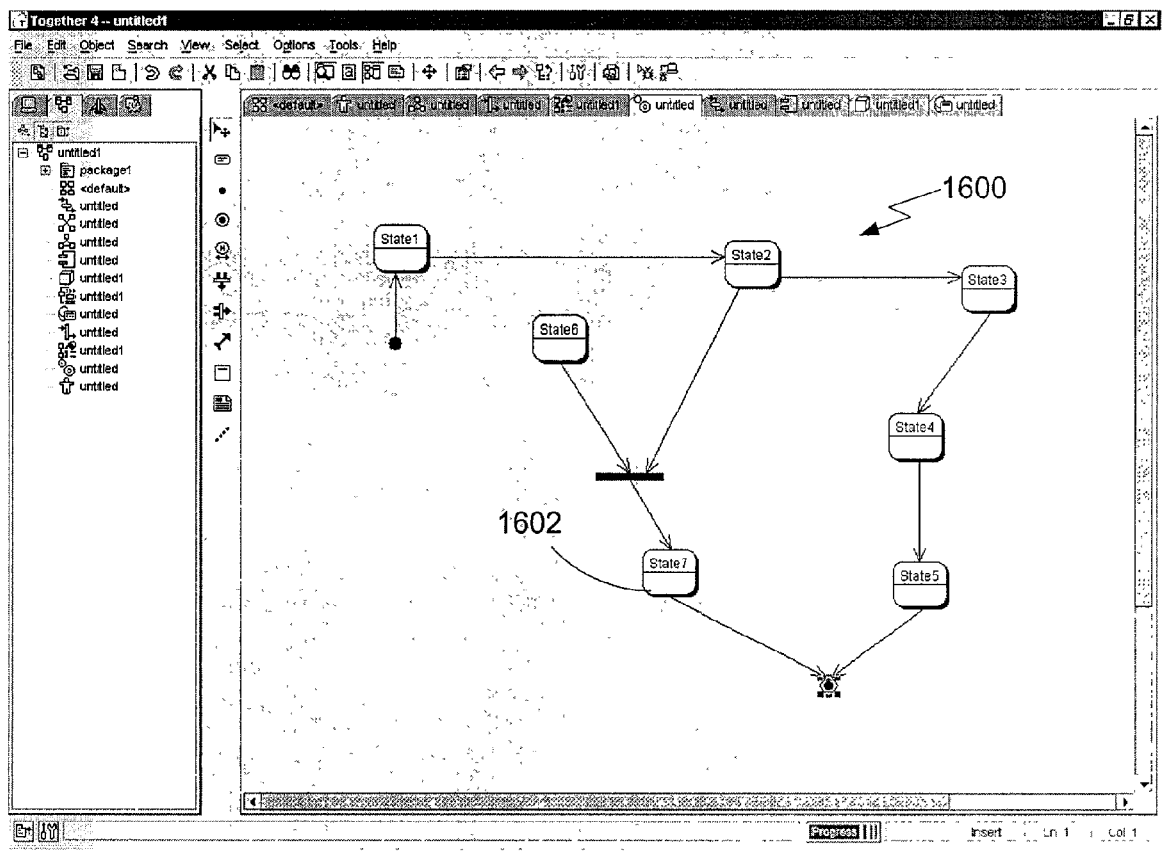
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
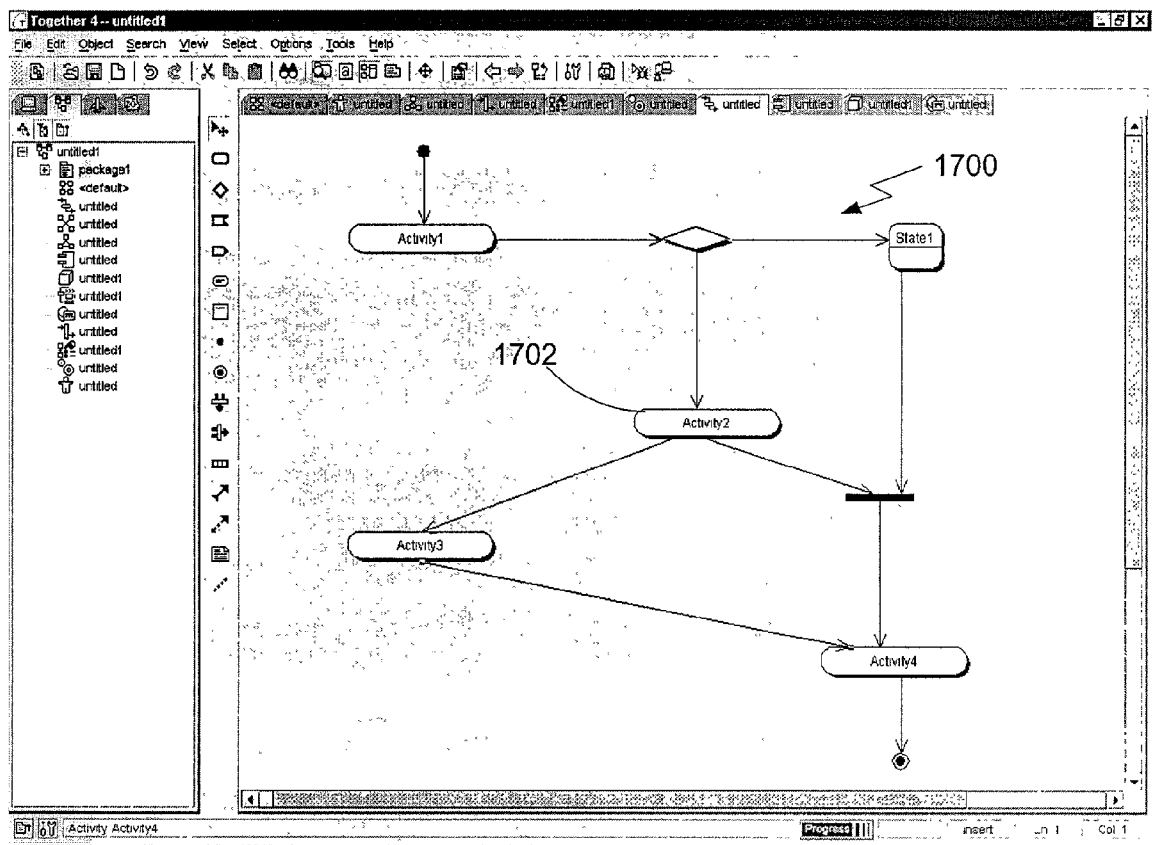
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
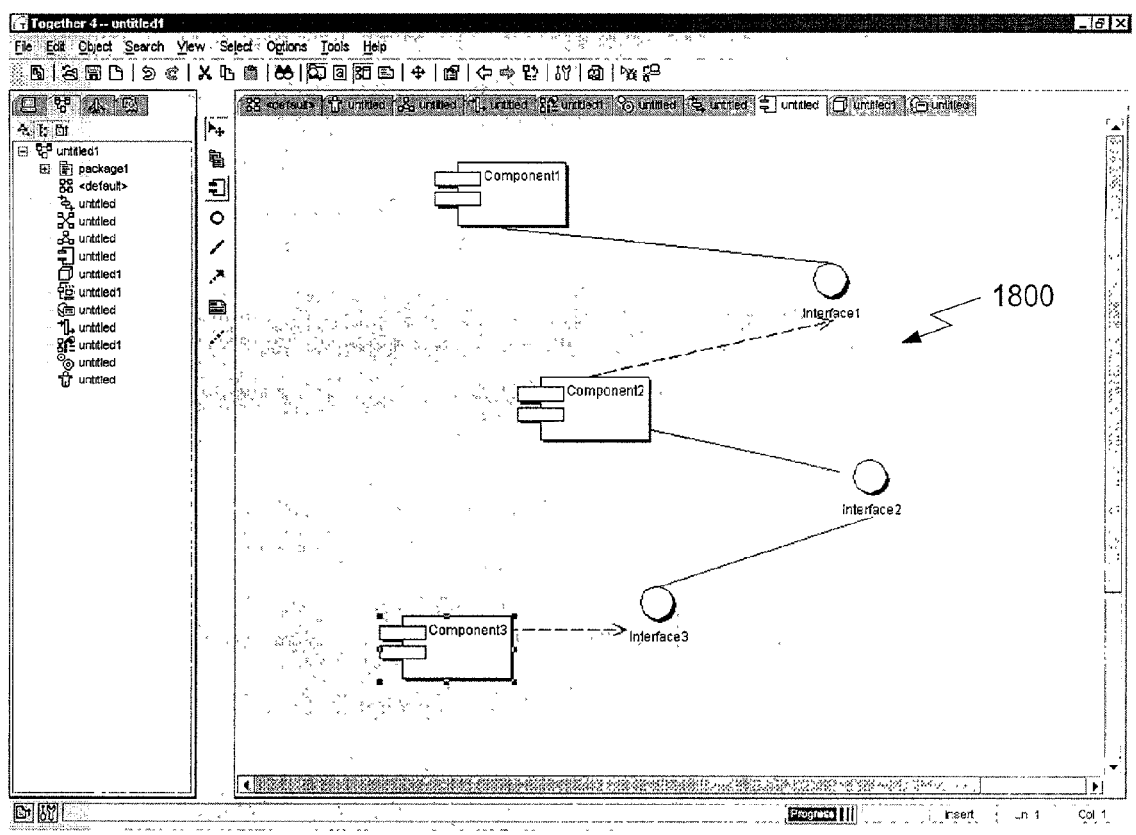
FIG. 18 depicts a user interface displayed by the software development tool depicted in FIG. 2, where the user interface displays a component diagram of source code.
Figure 19:
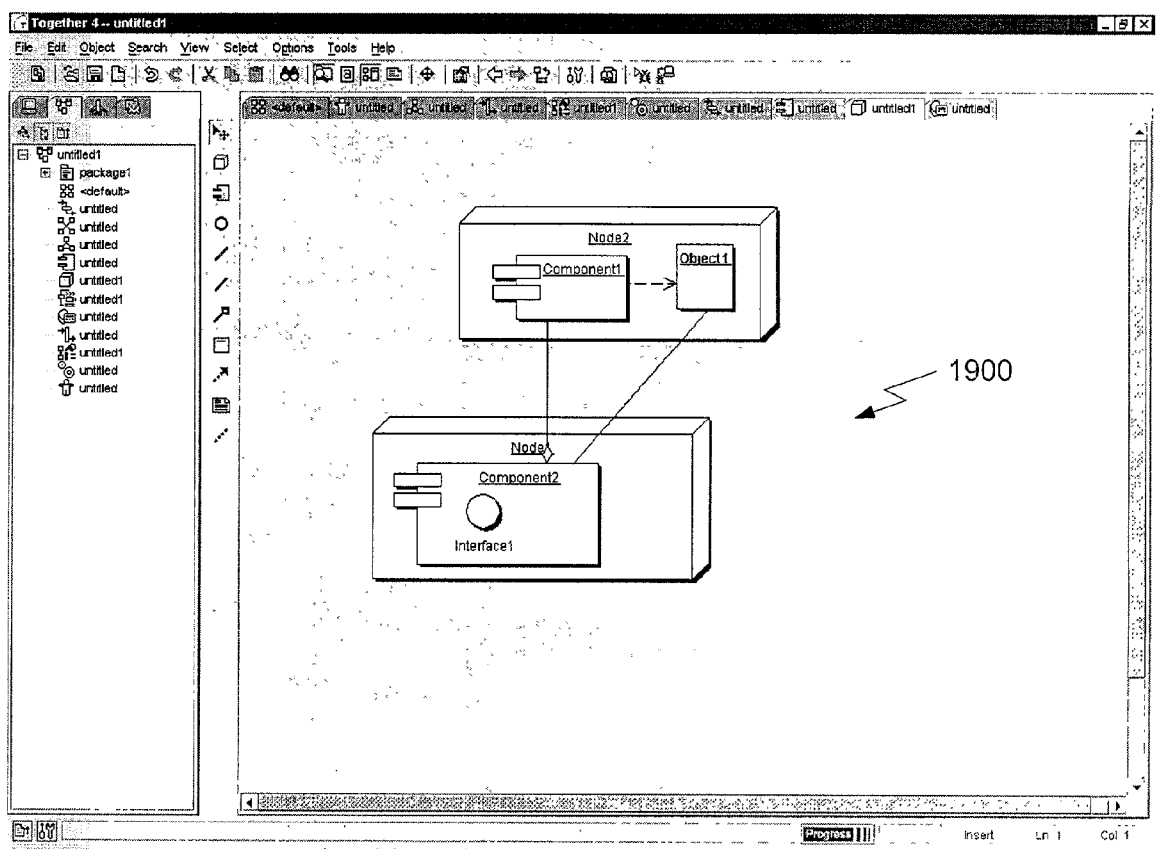
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, Deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Relating a Data Definition File and a Data Model Used for Distributed Computing

In addition to the functionality described above, the software development tool significantly reduces programming development time for a developer by allowing the developer to generate a data model, such as an Extensible Markup Language (XML) structure diagram, from a data structure in a data definition file. A data definition file is typically used to define how to format documents written in XML and passed between computers in a network. Among the known specifications for a data definition file are a Document Type Definition (DTD) specification and an XML schema specification. Both DTD and XML schema specifications describe the possible arrangement of tags and text that form the data structure in an XML document file. Thus, a DTD file is typically viewed as a set of rules that describes what is allowed and what is not in a respective XML document so that a computer receiving the XML document can correctly parse the document for processing. For example, an excerpt from an exemplary XML document for a purchase order transmitted between computers on a network is shown below:

```
<ship to address>
    <name>John Doe</name>
    <street>123 Main Street</street>
    <city>Central City</city>
    <state>IL</state>
    <zip>12345-6789</zip>
</ship to address>
```

This XML document will typically contain a header that identifies a corresponding DTD file that may be accessed by the receiving computer (e.g., 2004) to interpret or parse the purchase order in the XML document. In this situation, the corresponding DTD file would describe a valid <ship to address> element as consisting of a <name> element, followed by one or more <street> elements, followed by exactly one <city>, <state>, and <zip> element. The content of the <zip> might have a further data type constraint that it include either a sequence of exactly five digits or a sequence of five digits, followed by a hyphen, followed by a sequence of exactly four digits. No other text would be a valid ZIP code as defined by this corresponding DTD file. A DTD is more clearly described in the following reference that is incorporated herein by reference: Brett McLaughlin, JAVA™ and XML, O'Reilly (2000).

As described below, the software development tool saves development time by allowing a developer to transform the data structure in the DTD file into an XML structure diagram so the developer can visualize how a class of documents sent from the remote computer are to be defined or interpreted. The developer can then quickly design code to process information associated with the class of documents or design code to update the data structure to accurately reflect how an existing application currently processes the information. In addition, rather than having to manually write a DTD file (such as one defining how purchase orders are to be described), the software development tool allows the developer to first model the data structure in an XML structure diagram and then generate a corresponding DTD file from the XML structure diagram. Thus, by performing the processes described below, the software development tool allows the developer to implement design changes quickly by relating an XML structure diagram to a data structure stored in a DTD file or other known data definition files, such as an XML schema file.

Figure 20:
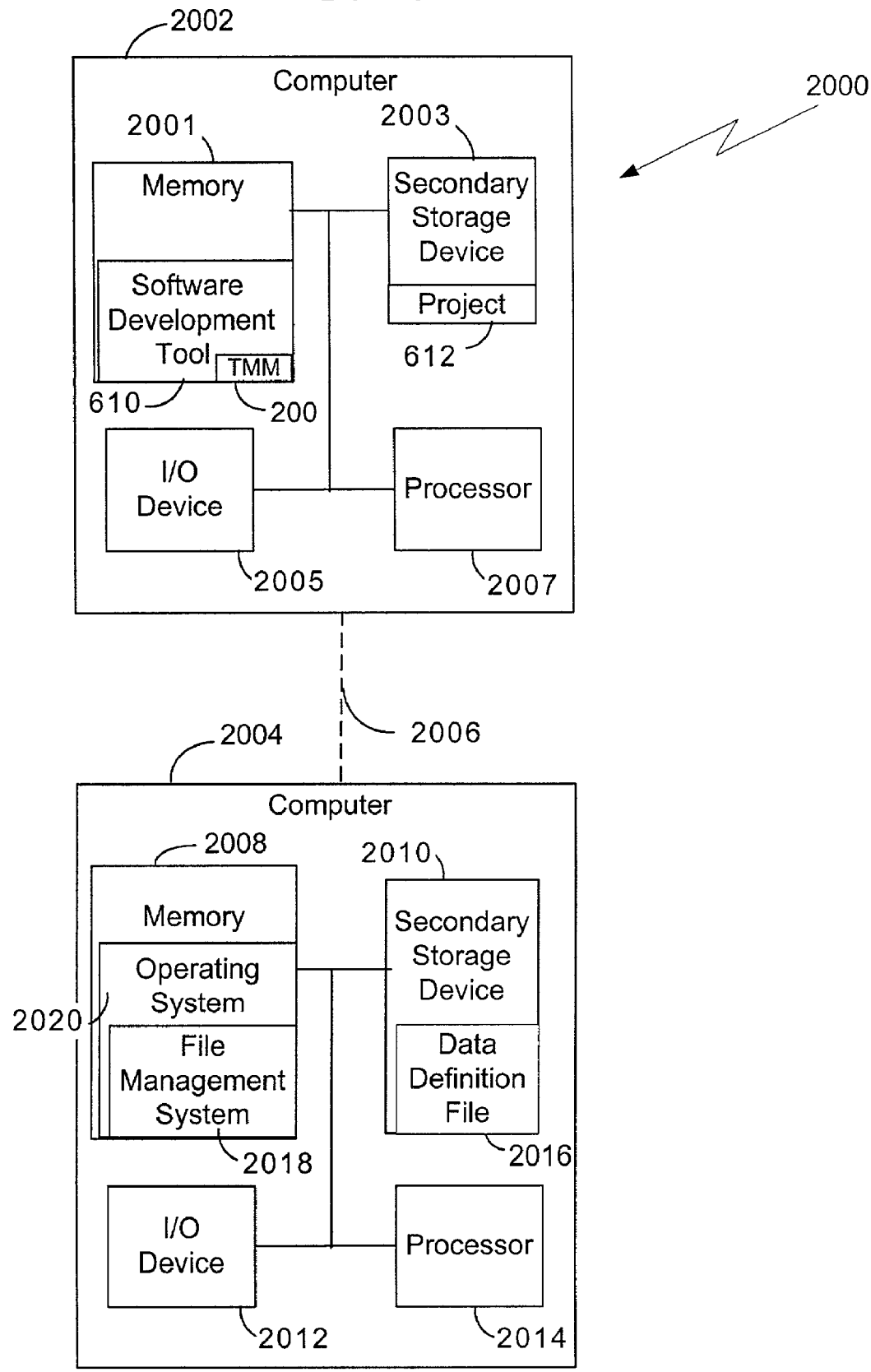
FIG. 20 depicts an exemplary data processing system in which the improved software development tool depicted may operate.

FIG. 20 depicts a data processing system 2000 suitable for practicing methods and systems consistent with the present invention, including relating an XML structure diagram to a data structure in a DTD file. Data processing system 2000 includes computers 2002 and 2004 that are connected via network 2006. The network 2006 may be any known physical or wireless link capable of supporting a data transmission between two computer systems, such as a Local Area Network (LAN), a Wide Area Network (WAN), Internet, or leased phone lines.

Computer 2002 includes the software development tool 610. The computer 2004 includes a memory 2008, a secondary storage device 2010, an I/O device 2012, and a processor 2014. The secondary storage device 2010 includes a data definition file 2016, such as a DTD file, that contains a data structure defining how corresponding information or documents are passed between computers in network 2006. Memory 2008 includes an operating system 2020 with a file management system 2018 that enables a developer using the software development tool to store, modify, and extract information from the data definition file 2016. Operating system 2020 may be any known operating system, such as Windows™ 2000 or a Unix based operating system executing on computer 2004.

In another implementation, the secondary storage device 2003 of the computer 2002 includes the data definition file 2016 and the memory 602 of the computer 2002 includes the file management system 2018. In this implementation, the software development tool 610 accesses the data definition file 2016 locally, without communicating via network 2006 to computer 2004.

Figure 21B:
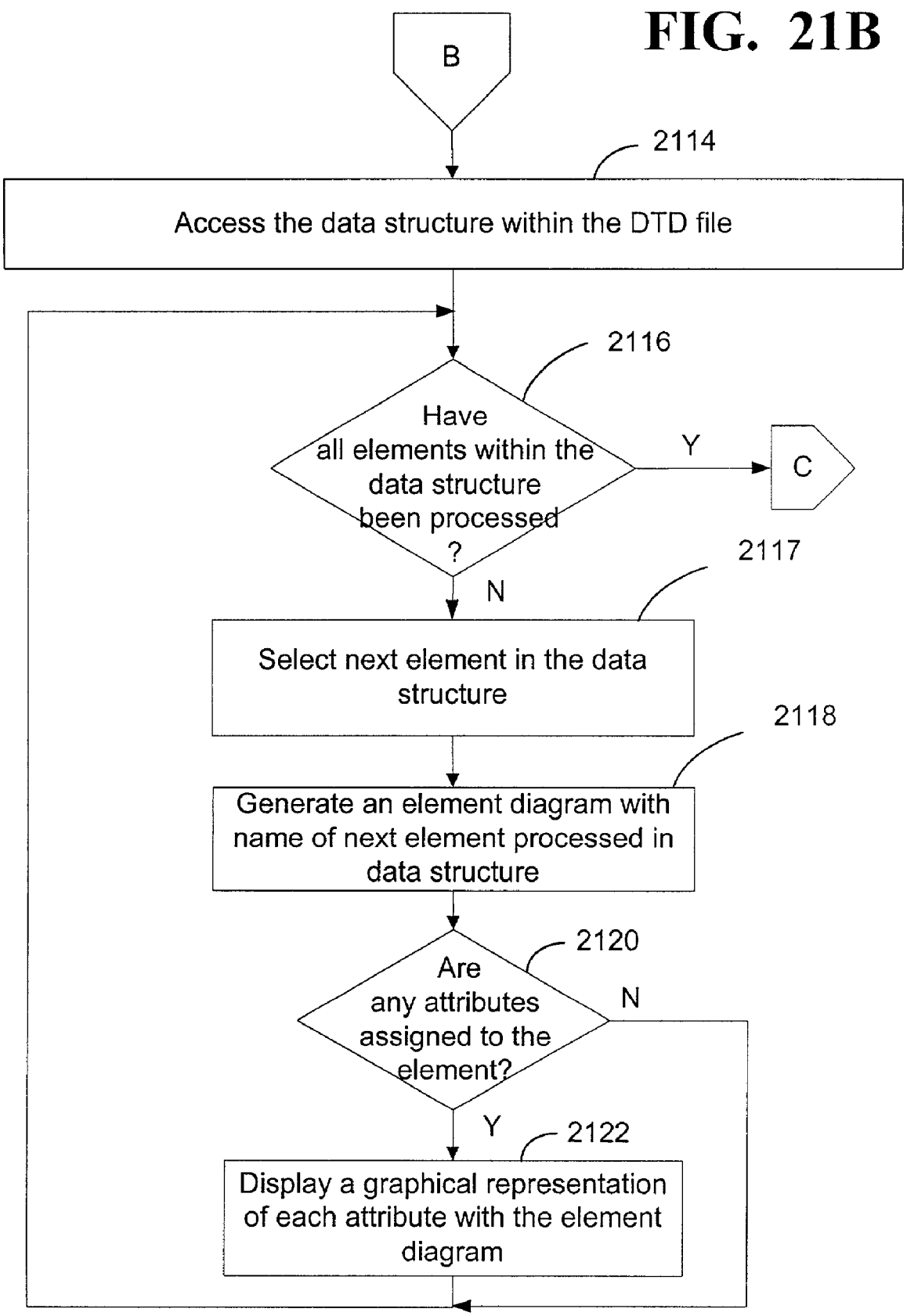
Figure 21C:
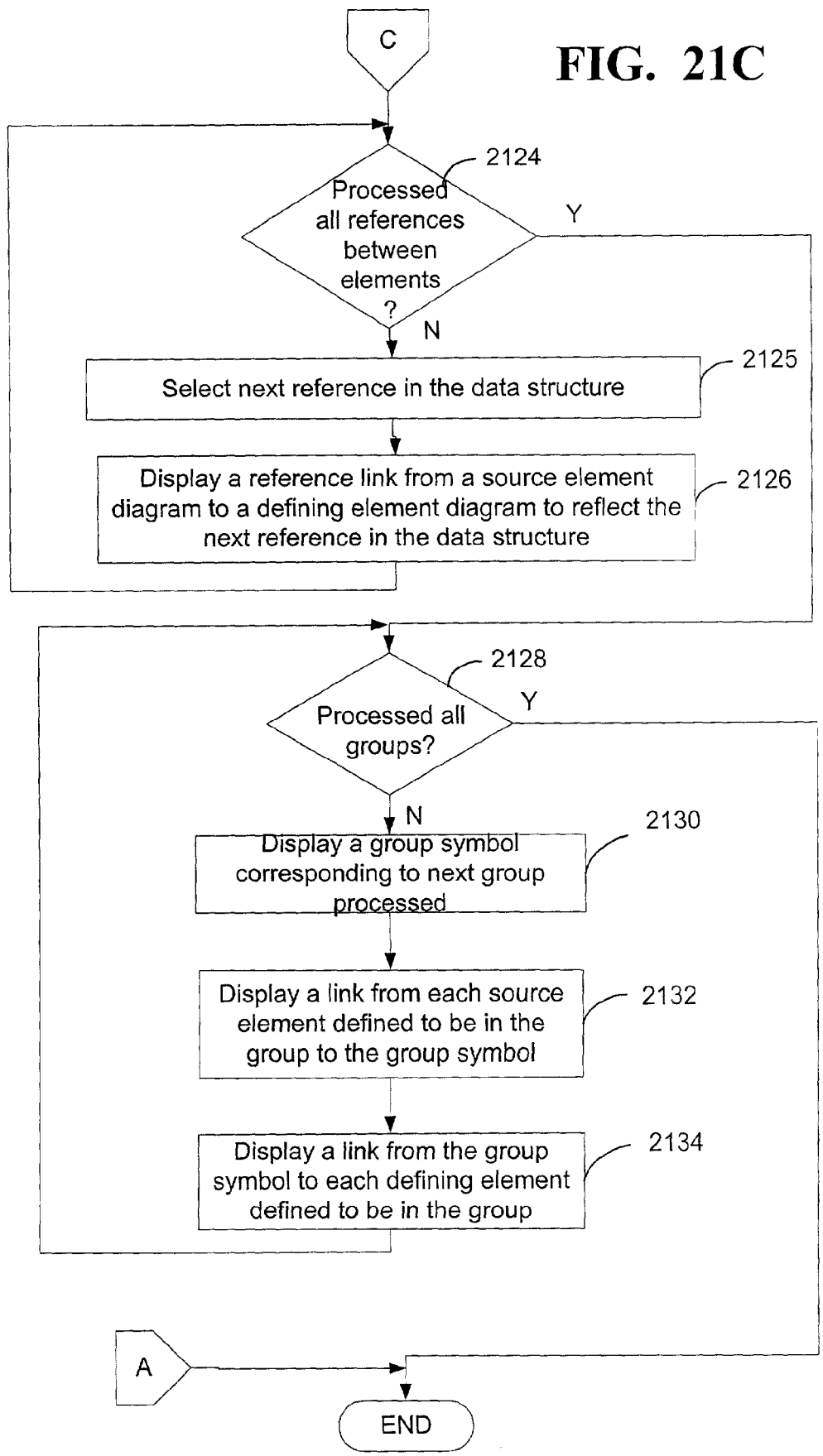
Figure 22:
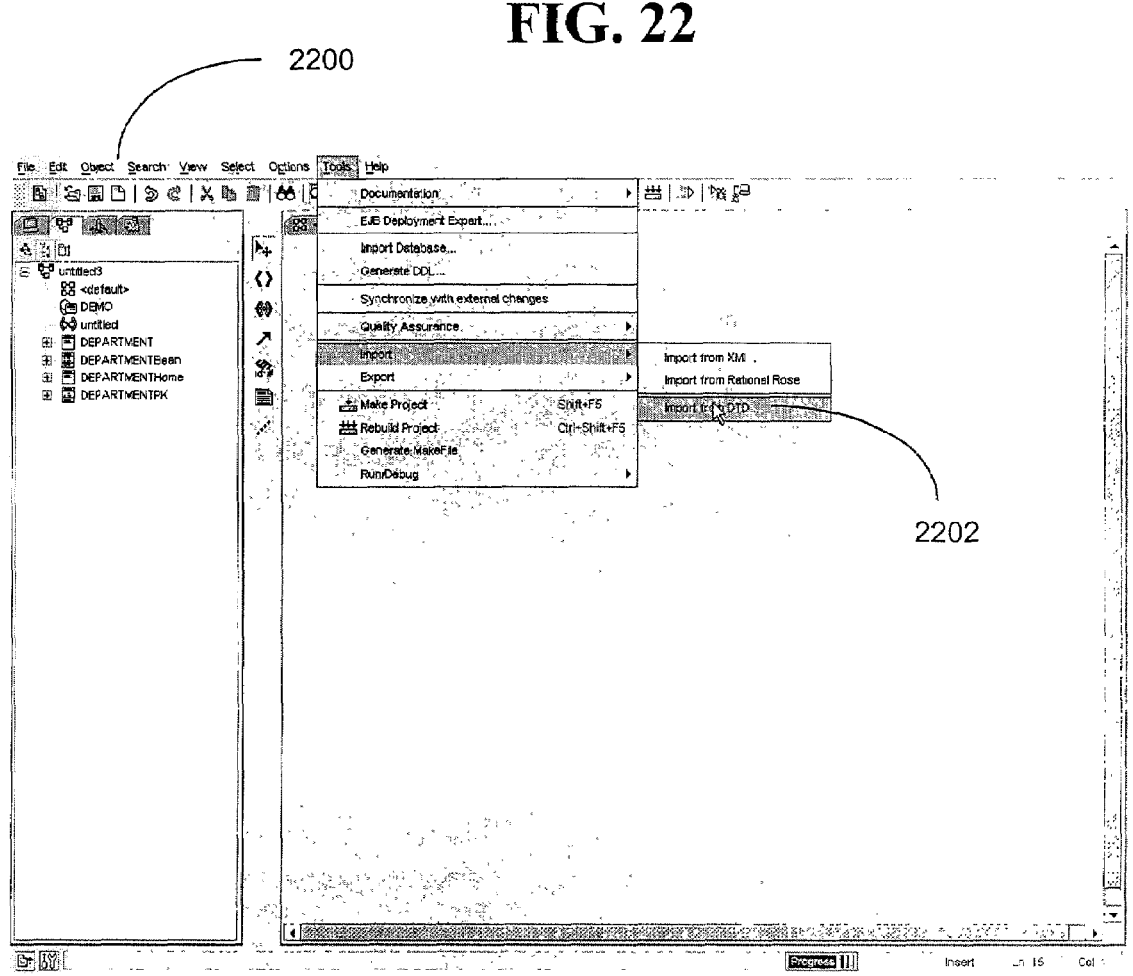
FIG. 22 depicts an exemplary user interface displayed by the software development tool for receiving a request to access a data definition file.

FIGS. 21A–C depict a flow diagram illustrating an exemplary process performed by the software development tool 610 for generating an Extensible Markup Language (XML) structure diagram from a Document Type Definition (DTD) file. To generate an XML structure diagram from a DTD, the software development tool first receives a request to access a data definition file (step 2102). As shown in FIG. 22, the software development tool may receive the request from a programmer via a menu selection 2202 on a user interface 2200. However, the software development tool may receive the request via any known programming input technique, such as a keyboard input or icon selection. As shown in FIG. 22, the menu selection 2202 indicates to the software development tool that the data definition file is a DTD file. One skilled in the art will appreciate, that the software development tool may perform the process in FIGS. 21A–C by accessing other known data definition files that define a group of documents similar to a DTD file.

Figure 23:
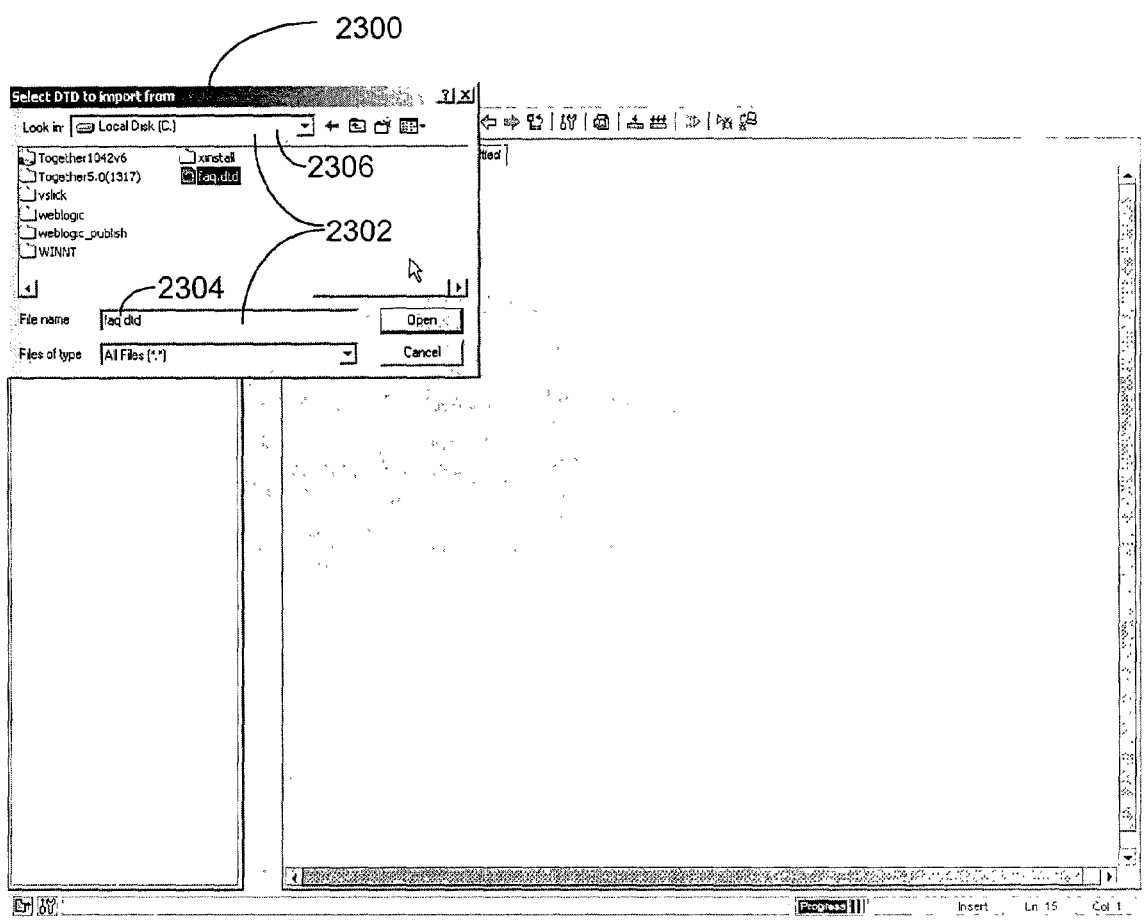
FIG. 23 depicts an exemplary user interface displayed by the software development tool for receiving access information for the data definition file.

Next, the software development tool receives access information for the data definition file (step 2104). In one implementation shown in FIG. 23, the software development tool receives access information 2302 that includes an identification 2304 of the data definition file 2016 and a location 2306 on the data processing system 2000 in FIG. 20 that indicates where the identified data definition file 2016 may be accessed. The identification 2304 in FIG. 23 of the data definition file 2016 may include a filename and an extension. As shown in FIG. 23, the identification 2304 has an extension of "dtd," which indicates to the software development tool that the data definition file is a DTD file. In the implementation shown in FIG. 23, the location 2306 is identified to be a local disk drive "C:" in secondary storage 2003 on computer 2002. In this implementation, the file management system 2018 that controls access to the data definition file 2016 is stored locally with the software development tool on computer 2002. In another implementation, the location 2306 may be mapped to a remote disk drive (not shown in figures) in secondary storage 2010 on computer 2004.

After receiving access information for the data definition file, the software development tool then determines if authorization is required to open the data definition file (step 2106). The software development tool determines if authorization is required based on the location 2306 of the data definition file 2016. For example, when location 2306 is mapped to a remote disk drive in secondary storage 2003 on computer 2004, the software development tool may require an access privilege to open and parse the data definition file 2016. The software development tool may also determine that authorization is required by querying the file management system 2018 in FIG. 20 that controls access to the data definition file 2016. If authorization is required, the software development tool receives an access privilege from the user (step 2108). The access privilege from the user received by the software development tool may include a user name and a password (not shown in figures). Having received the access privilege from the user, the software development tool then determines whether the access privilege is authorized (step 2110). The software development tool determines if the received access privilege is authorized by performing known authentication methods, such as querying the identified file management system to authenticate access or querying the computer 2002 or 2004 on the data processing system 2000 to authenticate access based on a respective user access profile.

If access is authorized or authorization is not required, the software development tool determines whether the data definition file contains a data structure written in a recognized language (step 2112). For example, FIG. 24 depicts an exemplary DTD file that the software development tool opens using access information 2302 shown in FIG. 23. After opening the DTD file, the software development tool identifies that the data structure 2402 in FIG. 24 has a language tag 2403, "<?xml version="1.0" encoding="ASCII?>. The software development tool recognizes that language tag 2403 indicates that the data structure 2402 of the DTD file is written in a known XML format that the software development tool is able to parse to form an XML structure diagram. In another implementation, the software development tool may check that the data structure within the container conforms to a known DTD specification. For example, the software development tool may scan the contents of the data structure 2402 in the DTD file in FIG. 24 to assess whether the tags contained therein conform to a group of known DTD tags, such as "<!ELEMENT elementname elementtype>' to identify a data element or "<ATTLIST elementname>" to identify an attribute list for the named data element. DTD tags and other constructs for forming a DTD file are move clearly described in the following reference, which is incorporated herein by reference: Simon St. Laucent and Robert J. Bigger, Inside XML DTD's with CDROM, MaGraw-Hill (2000).

After determining that the data structure in the DTD file is written in a recognizable language, the software development tool parses the data structure within the DTD file (step 2114 in FIG. 21B). To parse data structure 2402 in FIG. 24 to generate a corresponding XML structure diagram, the development tool loads a module "XML structure diagram" contained in module 704 in FIG. 7. Using module "XML structure diagram," the software development tool parses data structure 2402 based on a group of known DTD tag definitions to form a data element, to assign attribute entities to the element, or to identify a reference link from a data element to another data element. The process for generating the XML structure diagram will be described in reference to data structure 2402 in FIG. 24, which depicts a data structure for transmitting a personnel management data system document between applications or computer systems on a network (e.g., network 2006). For example, an application executing on a computer of a large corporation may use data structure 2402 to generate an XML document pertaining to new employees that is to be sent to an insurance company for processing insurance benefits. Alternatively, the XML document pertaining to new employees that is generated using data structure 2402 may be sent from a human resources division of the corporation to a payroll division of the corporation for processing paychecks for the new employees.

Figure 25:
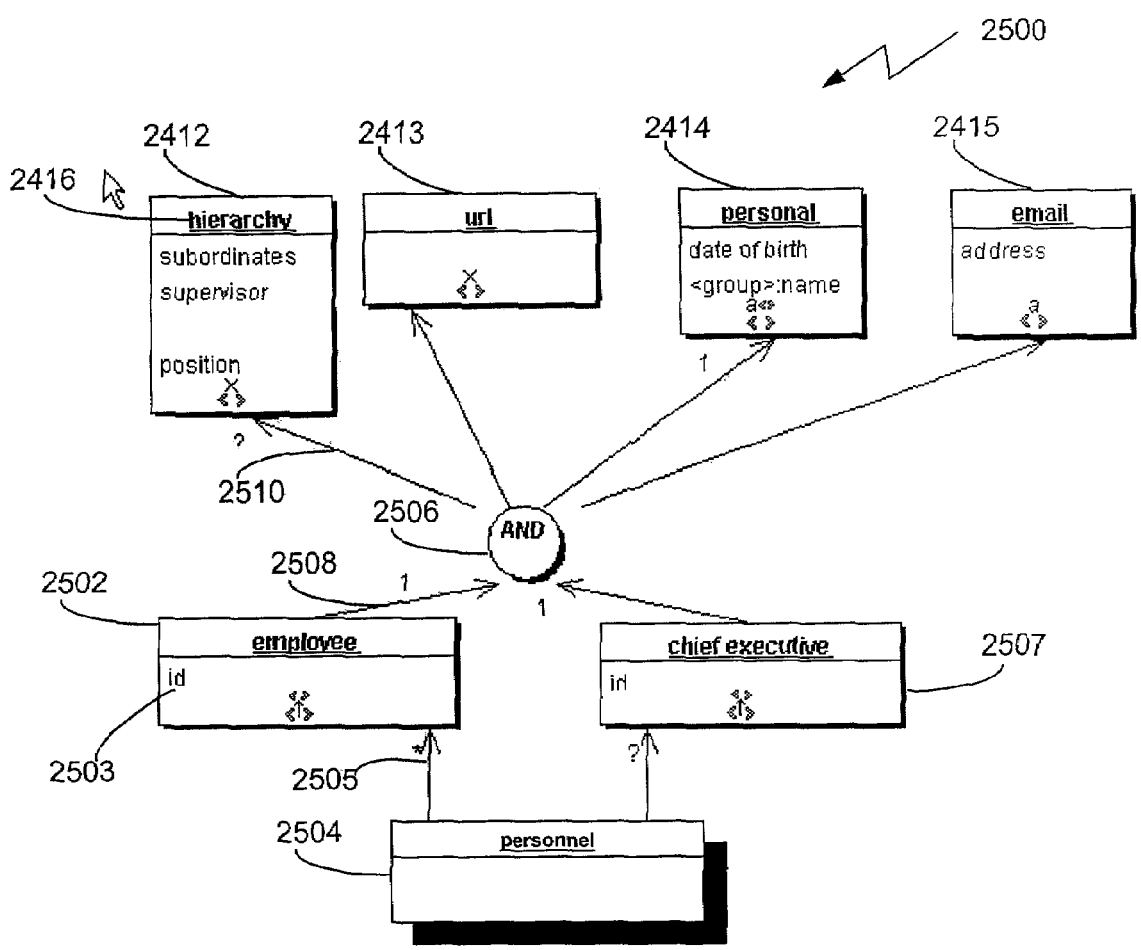
FIG. 25 depicts an exemplary XML structure diagram generated by the software development tool from the data structure in the data definition file in FIG. 24.

As part of the process for generating the XML structure diagram from the data structure in the DTD file, the software development tool determines whether all data elements within the DTD file have been processed (step 2116). If all the data elements have not been processed (i.e., the software development tool has not finished scanning the DTD file), the software development tool selects the next data element in the data structure, starting with the first data element (step 2117). To process all the data elements, the software development tool parses data structure 2402 within the DTD file in FIG. 24 from to identify each data element tag, such as <!ELEMENT employee (%xmlModelGroup1;)> 2404, where employee is recognized as the name of the data element and %xmlModelGroup1 is recognized as a type or definition for the data element. As is well-known in the art, a DTD data element tag (or identifier) is specified as <!ELEMENT elementname elementdefinition/type>. After selecting the next data element, the software development tool then generates a data element diagram with the name of the selected data element (step 2118). As shown in FIG. 25, in response to parsing data structure 2402 in FIG. 24, the software development tool processes data element 2404 in FIG. 24 (i.e., "<!ELEMENT employee (%xmlModel-Group1;)>"). The software development tool then generates data element diagram 2502 with name 2406 "employee" of the data element 2404 (step 2156). Thus, the software development tool begins to build a data model (i.e., XML structure diagram in FIG. 25) that reflects the textual data structure in the DTD file in FIG. 24.

Next, the software development tool determines whether any attribute has been assigned to the data element (step 2120). An attribute assigned to the data element becomes a unique identifier for the data element as described below. To identify an attribute, the software development tool searches for the attribute tag <!ATTLIST elementname>that references data element 2404 with name 2406, such as <!ATTLIST employee identifier CDATA #REQUIRED> 2408. The software development tool recognizes that more than one attribute may be assigned to the data element via the "ATTLIST" attribute tag. If any attribute has been assigned, the software development tool displays a graphical representation of each assigned attribute with the respective data element diagram. As shown in FIG. 25, the software development tool displays the graphical notation 2503 in association with data element diagram 2502 to reflect assigned attribute 2410 (i.e., "identifier") for data element 2404 with name 2406 (i.e., "employee"). The software development tool then continues processing at step 2116 to generate a data element diagram in XML structure diagram 2500 for each data element defined in data structure 2402 in FIG. 24.

If all data elements within the data structure in the DTD file have been processed, the software development tool determines whether all references between data elements have been processed (step 2124 in FIG. 21 C). If all references have not been processed, the software development tool selects the next reference in the data structure for processing, starting with the first reference. As explained below, a reference from a source element to a defining element allows the source element to be assigned an attribute or characteristic of the defining element. In one implementation, the software development tool may store an identified reference as the DTD file is parsed, rather than parsing the DTD file a second time. Following known DTD constructs, the software development tool recognizes that references are identified parenthetically within a data element tag, such as reference 2412 in FIG. 24 (i.e., "<!ELEMENT personnel (employee*, chief_executive?)>") which identifies that source element personnel contains zero or more "employee" elements.

After selecting the next reference, the software development tool displays a reference link from a source element diagram to a defining element diagram to reflect the next reference processed within the data structure. For example, the software development tool displays reference link 2505 in FIG. 25 from source element diagram 2505 (i.e., "personnel" element diagram) to a defining element diagram 2502 (i.e., "employee" element diagram). The reference link 2505 provides a visual indication to the developer that the "employee" element in data structure 2402 is assigned to the "personnel" element in data structure 2402.

If all references between data elements have been processed, the software development tool then determines whether all groups in the data structure have been processed (step 2128). Groups identify a number of source elements within a data structure that have common references to a number of defining elements within the data structure. In one implementation, the software development tool may identify groups while parsing the DTD file in FIG. 24. The software development tool identifies a group by matching a group attribute, such as defined by <!ENTITY %xmlModelGroup1 "hierarchy?, url*, personal, email*"> 2414, to the corresponding element that has this group attribute, such as <!ELEMENT employee (%xmlModelGroup1;)> 2404. If all groups have not been processed, the software development tool displays a group symbol corresponding to the next group processed, starting with the first group (step 2130). As shown in FIG. 25, the software development tool displays group symbol 2506 to provide a visual indication to the developer that a group of source elements (i.e., depicted as 2502 and 2507 in FIG. 25) have been processed in data structure 2402 with common references to a group of defining elements (i.e., depicted as 2512, 2513, 2514, and 2515 in FIG. 25). Group symbol 2506 is the destination in the links from the source elements and is the source in the links to the defining elements.

Next, the software development tool then displays a link from each source element diagram defined to be in the group to the group symbol (step 2132). For example, the software development tool displays link 2508 in FIG. 25 to reflect that data element "employee" (i.e., 2404 in FIG. 24 that is depicted as 2502 in FIG. 25) is a source element that has a group attribute, "%xmlModelGroup1," which refers to the defining elements or group attribute members identified in "<!ENTITY %xmlModelGroup1 "hierarchy?, url*, personal, email*" 2414 in data structure 2402.

The software development tool then displays a link from the group symbol to each defining element defined to be in the group (step 2173). When parsing data structure 2402, the software development tool recognizes that the group attribute (%xmlModelGroup1) is defined by "<!ENTITY %xmlModelGroup1 "hierarchy?, url*, personal, email*" 2414. Thus, the software development tool identifies that "hierarchy?," url*, "personal," and "email" are defining elements (or group attribute members) in the group identified by "%xmlModelGroup1" in data structure 2402. Note that the software development tool is able to identify "hierarchy?," url*, "personal," and "email" as data elements and generate a respective data element diagram (i.e., depicted as 2512, 2513, 2514, and 2515 in FIG. 25) when performing the process steps 2116 through 2122. Having identified the defining elements in the group corresponding to "%xmlModelGroup1," the software development tool displays a link from group symbol 2506 in FIG. 25 to each defining element in the group. For example, the software development tool displays the link 2510 from group symbol 2506 to defining element 2512 ("hierarchy?") that is a group attribute member of "%xmlModelGroup1" as defined in data structure 2402. In one implementation, the software development tool stores the information for generating XML structure 2500 in a graphical view file in a location provided by the programmer so that the programmer is able to access XML structure 2500 at a later time. The information stored in the graphical view file includes: the identification of each data element diagram with attributes assigned to the respective data element diagram, references between elements, and references between source elements and defining elements in a group.

Thus, the software development tool generates and stores an XML structure diagram based on a corresponding DTD file that contains data elements and identifies relationships between the data elements as described above. The software development tool, by generating an XML structure diagram (i.e., 2500) from a corresponding DTD file, allows a developer to quickly visualize the data elements and relationships between the data elements in the DTD file. The developer is then able to quickly generate code for an application that interprets an XML document, such as an employee personnel file, based on the DTD file.

Figure 26A:
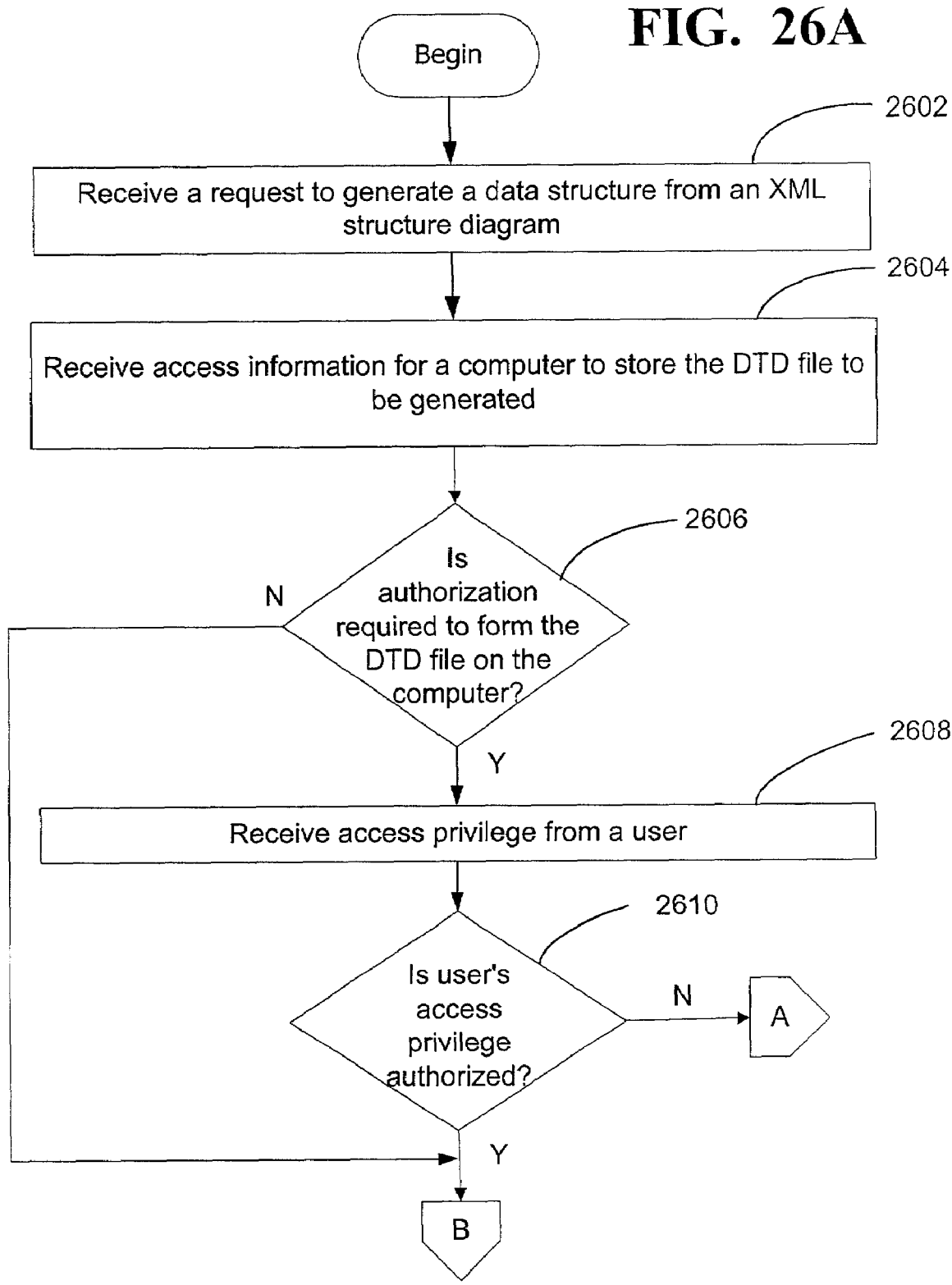
FIGS. 26A–C depict a flow diagram illustrating an exemplary process performed by the software development tool to generate a data definition file from an XML structure diagram.
Figure 26B:
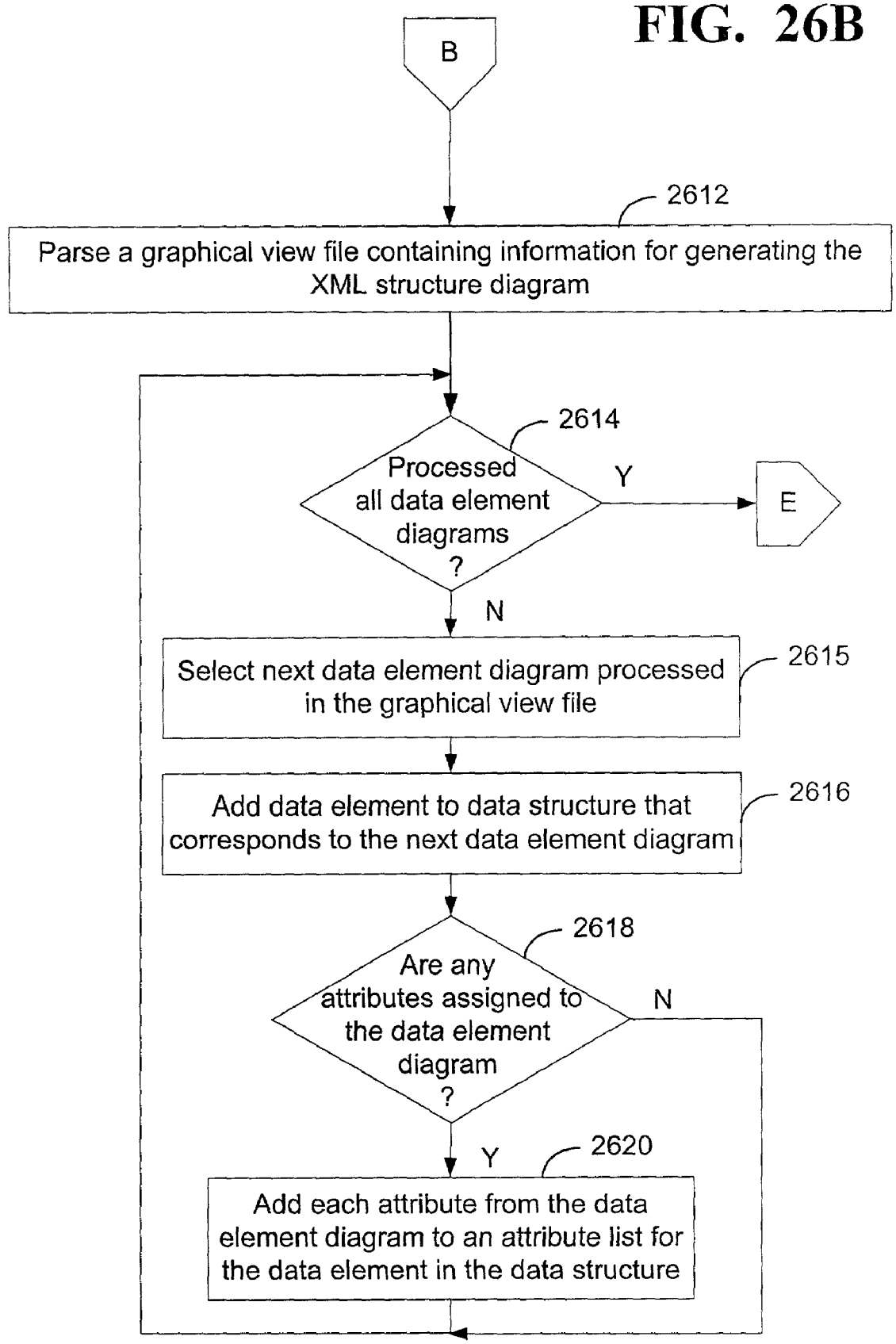
Figure 26C:
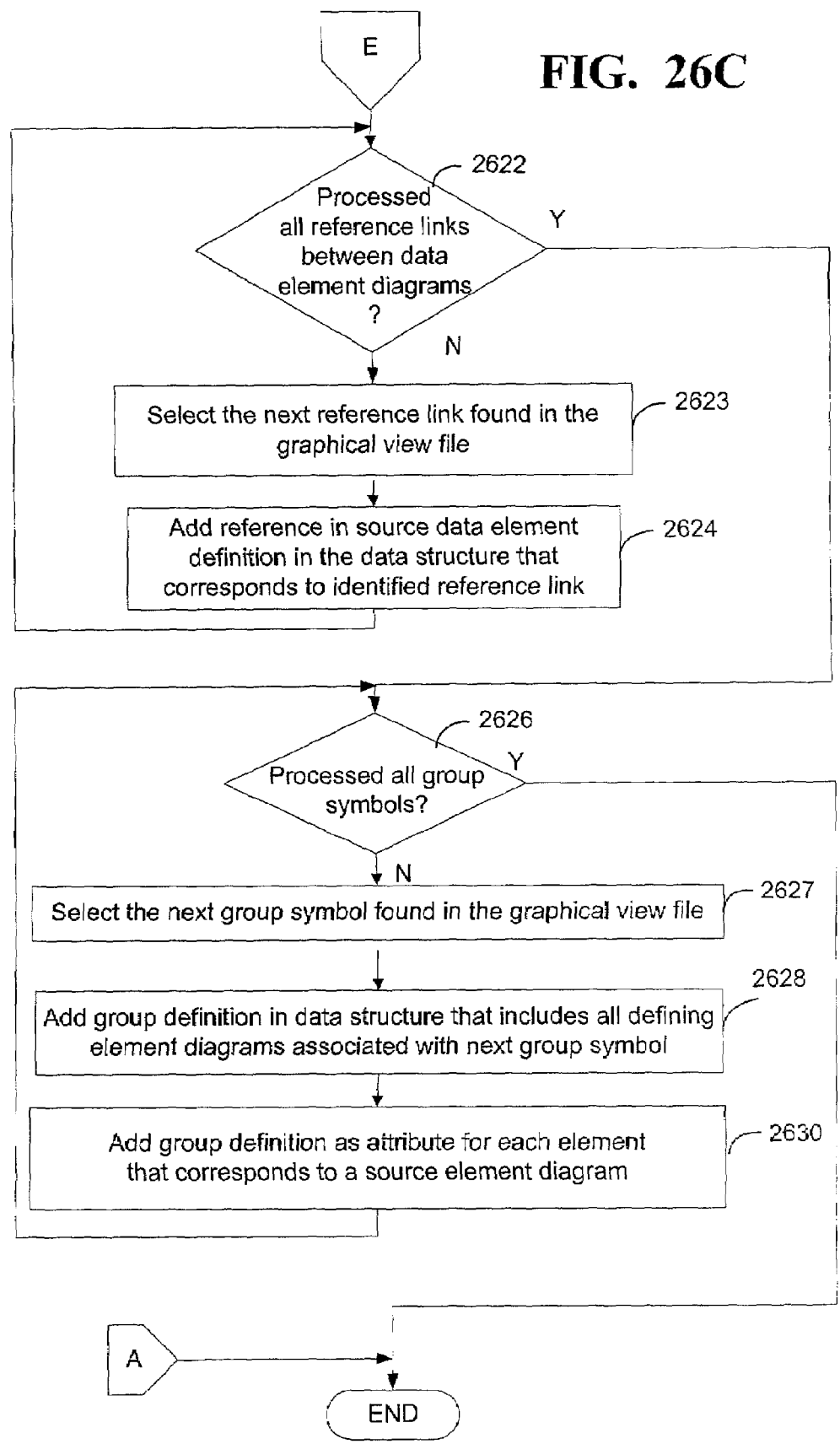
Figure 27:
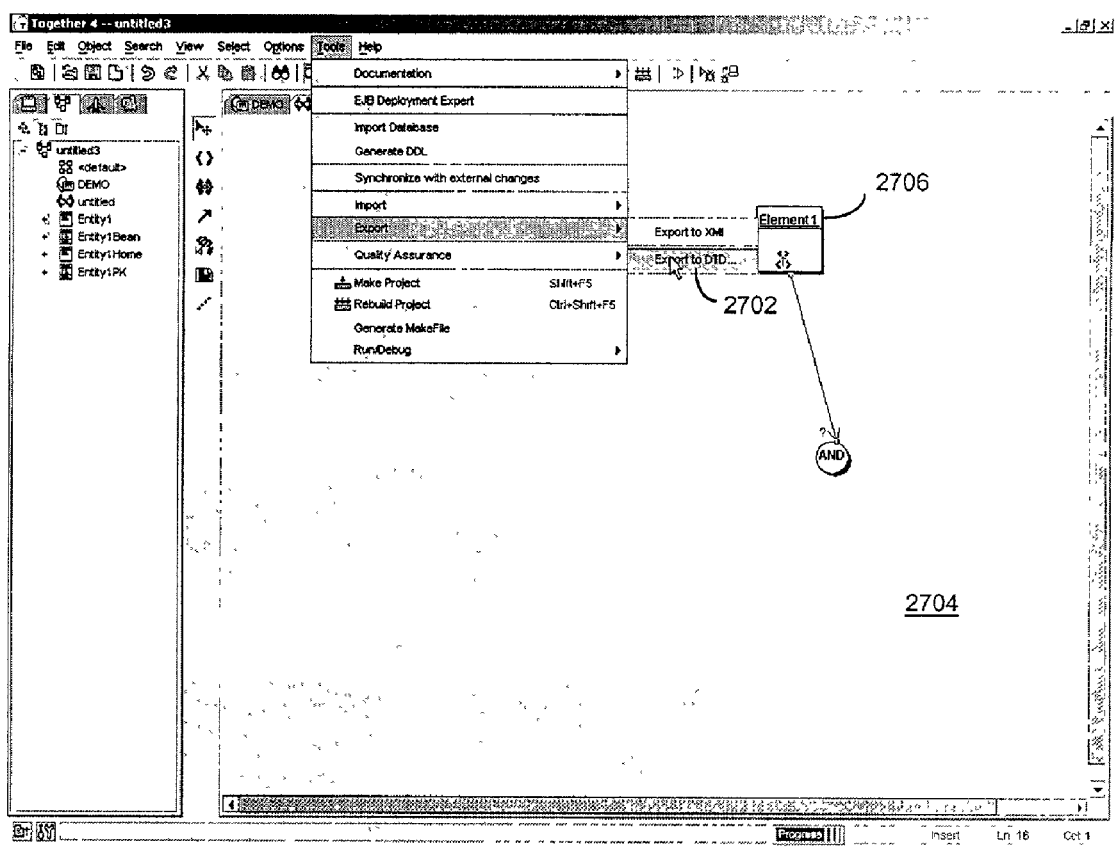
FIG. 27 depicts an exemplary user interface displayed by the software development tool for receiving a request to generate a data definition file from an XML structure diagram.

The developer can also use an XML structure diagram (i.e., 2500) to visually ascertain what may need to be corrected in a data structure (i.e., 2402 in FIG. 24) in order to accurately describe an XML document produced by an application designed by the developer. For example, assuming that the developer modifies XML structure diagram 2500 (e.g., adds "home address" attribute to "personal" data element 2514 in FIG. 25) or creates a new XML structure diagram to describe a new data model (e.g., a purchase order for a supplier), the software development tool saves the developer time and effort by automatically generating the corresponding DTD file. In FIGS. 26A–C, a flow diagram illustrates an exemplary process performed by the software development tool for generating a data structure in a DTD file from an XML structure diagram. To generate the data structure, the software development tool receives a request to form a data structure from an XML structure diagram (step 2602). As shown in FIG. 27, the software development tool may receive the request to generate the data structure via a programmer choosing menu selection 2702 on user interface 2700. However, the software development tool may receive the request via any known programming input technique, such as a keyboard input or icon selection on user interface 2700. In one implementation, when the software development tool receives the request to generate the data structure in the DTD file, the software development tool may also receive the indication that the XML structure to be used to generate the data structure is the one currently displayed on graphical pane 2704 (i.e., XML structure 2702). However, in another implementation, the programmer may provide the software development tool of a name of a graphical view file containing information (described above) stored by the software development tool for generating a respective XML structure diagram. The software development tool, as described below, may use the information in the graphical view file to generate the corresponding data structure in the DTD file.

Figure 28:
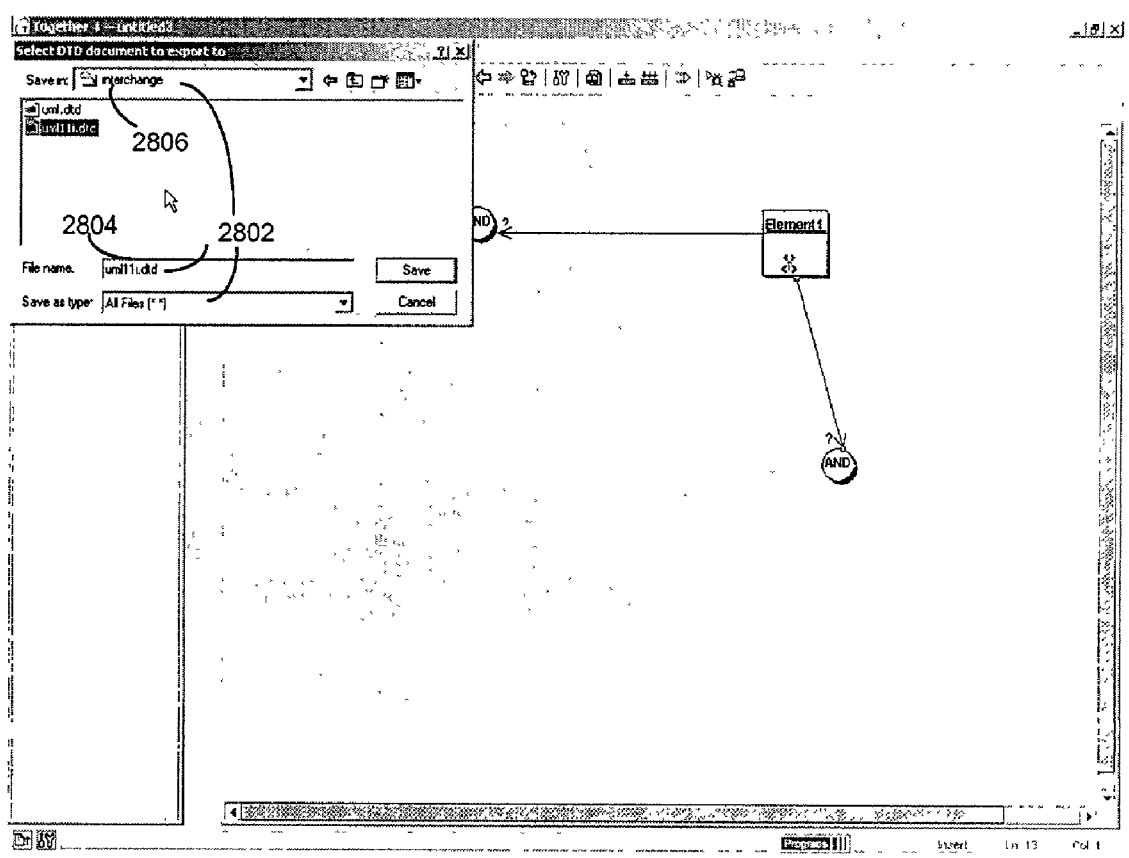
FIG. 28 depicts an exemplary user interface displayed by the software development tool for receiving access information for a computer where the data definition file is to be stored.

After receiving the request to generate the data structure, the software development tool also receives access information for a computer to store the DTD file that is to be generated (step 2604). In one implementation shown in FIG. 28, the software development tool receives access information 2802 that includes an identification 2804 and a location 2806 on the data processing system 2000 that indicates where the DTD file to be generated may be stored by the software development tool. The identification 2804 of the DTD file may include a filename and an extension to be used by the software development tool when creating the DTD file. A programmer may indicate to the software development tool that location 2806 for storing the DTD file is local by providing a storage location or drive that is mapped to secondary storage 2003 on computer 2002. In this implementation, the file management system 2018 that controls access to the data definition file 2016 is stored locally with the software development tool on computer 2002. In another implementation, the developer may indicate that location 2806 is a remote location by providing a storage location or drive that is mapped to secondary storage 2010 on computer 2004.

Returning to FIG. 26A, after receiving access information identifying where the DTD file is to be stored, the software development tool then determines if authorization is required to access the computer where the DTD file is to be stored (step 2606). The software development tool may determine if authorization is required based on location 2806 as described above when performing step 2106 in FIG. 21. If authorization is required, the software development tool receives an access privilege from the user (step 2608). The access privilege received by the software development tool may include a user name and a password (not shown in figures). Having received the access privilege from the user, the software development tool then determines whether the access privilege is authorized (step 2610). The software development tool determines if the received access privilege is authorized by performing known authentication methods, such as querying the identified file management system to authenticate access or querying the computer 2002 or 2004 on the data processing system 2000 to authenticate access based on a respective user access profile.

If access is authorized or authorization is not required, the software development tool next parses a graphical view file containing information for generating the XML structure diagram (step 2112 in FIG. 26B). For clarity in the discussion to follow, the remaining process steps in FIGS. 26B and 26C assume that a programmer is using the software development tool to generate a data structure in a DTD file (e.g., data structure 2402 in FIG. 24) from XML structure diagram 2500. In one implementation where the programmer has indicated that the XML structure diagram that is currently displayed in the graphical pane 2704 in FIG. 27, the software development tool may invoke TMM 200 for a location of a graphical view file containing information used to generate the XML structure diagram. In another implementation where the programmer has provided a name for the XML structure diagram, the software development tool may search files in project 612 to locate a graphical view file with the same name. Once the graphical view file is located, the software development tool may then open and parse the information for generating XML structure diagram 2500 that is contained in the graphical view file. Using access information 2802, the software development tool also opens the DTD file that will contain the data structure generated from XML structure diagram 2500.

As part of the process for generating the data structure from the XML structure diagram, the software development tool determines whether all data element diagrams in the respective graphical view file for the XML structure diagram have been processed (step 2614). If not all the data element diagrams have been processed (i.e., the software development tool has not finished parsing the graphical view file), the software development tool selects the next data element diagram processed in the graphical view file for processing, starting with the first data element diagram. To process the next data element diagram, the software development tool parses the graphical view file associated with the XML structure diagram for a class diagram reference. After selecting the next data element diagram, the software development tool then adds a data element to the data structure that corresponds to the next data element diagram processed in the graphical view file (step 2616). The data element added to the data structure is placed within a data element tag and provided a name that corresponds to the data element diagram. For example, when parsing the graphical view file containing the information for generating XML structure diagram 2500, the software development tool locates the portion of the information for generating the "employee" data element diagram 2502. The software development tool then adds a data element tag 2404 to the DTD file as shown in FIG. 24. Note that the group attribute, "%xmlModel-Group1," may be added in a later process step when the software development tool identifies a group symbol in the graphical view file of XML structure diagram 2500.

Next, the software development tool determines whether any attribute is assigned to the element diagram (step 2618). The software development tool identifies whether any attribute is assigned if any attribute is stored in association with the data element diagram in the respective graphical view file. If any attribute has been assigned, the software development tool adds each attribute from the element diagram to an attribute list for the element in data structure (step 2620). For example, when parsing the graphical view file associated with XML structure diagram 2500, the software development tool identifies that "employee" data element diagram 2502 has an associated "id" attribute 2503. The software development tool stores the "id" attribute 2503 within a known DTD attribute tag (e.g., 2408 in FIG. 24) that follows the known DTD format for defining an attribute, such as <!ATTLIST elementname attributename attributetype attributemodifier>. If more than one attribute is assigned, the software development tool stores each in succession after the "elementname" within the "ATTLIST" attribute tag. Note information that may not be displayed by the software development tool, such as attributetype and attributemodifier, may be stored in the graphical view file for generating the DTD file when requested by the programmer. For example, the software development tool may store the known attributetype "CDATA" within the graphical view file in association with the portion of information stored for "employee" data element diagram 2502. As is well-known, "CDATA" represents a "Character Data" construct that indicates the respective attribute may have any character data value. The software development tool then continues processing at step 2614 to generate a data element in the data structure (e.g., data structure 2402 in FIG. 24) for each data element diagram identified in the graphical view file associated with XML structure diagram 2500 in FIG. 25.

If all data element diagrams within the graphical view file associated with the XML structure diagram have been processed, the software development tool determines whether all reference links between data element diagrams have been processed (step 2622 in FIG. 26C). If all references are not processed (i.e., the software development tool has not completely parsed the information in the graphical view file), the software development tool selects the next reference link processed in the graphical view file for processing, starting with the first reference link (step 2623). The software development tool then adds a reference in a source data element definition in the data structure that corresponds to the next reference link processed in the graphical view file (step 2624). For example, when parsing the graphical view file associated with XML structure diagram 2500, the software development tool identifies that reference link 2505 associates defining "employee" data element diagram 2502 with source "personnel" data element diagram 2504. Based on the identified reference link 2505, the software development tool adds "employee*" as a reference in the definition for the "personnel" data element (e.g., 2412 in FIG. 24) in the data structure generated by the software development tool. Adhering to the known constructs for defining elements in a DTD file as disclosed in Brett McLaughlin, JAVA™ and XML, O'Reilly (2000) previously incorporated herein by reference, the software development tool nests the reference "employee" parenthetically as shown in "personnel" data element 2412 in FIG. 24.

If all references between data elements have been processed, the software development tool determines whether all group symbols in the XML structure diagram have been processed (step 2626). If not all group symbols have been processed, the software development tool selects the next group symbol processed in the graphical view file for processing, starting with the first group symbol (step 2627. The software development tool then adds a group definition in the data structure for the identified group symbol that includes all defining element diagrams associated with the next group symbol (step 2628). For example, when parsing the graphical view file associated with XML structure diagram 2500, the software development tool identifies that group symbol 2506 is linked to defining data element diagrams 2512, 2513, 2514, and 2516 in FIG. 25. The software development tool then adds a group definition (e.g., 2414 in FIG. 24) to the DTD file that includes the names (i.e., "hierarchy," "url," "personal," and "email") associated with the identified defining element diagrams 2512, 2513, 2514, and 2516 in FIG. 25.

Next, the software development tool adds the group definition as an attribute for each data element in the DTD file that corresponds to a source element diagram linked to the group symbol (step 2630). For example, as shown in FIG. 25, the software development tool recognizes that group symbol 2506 is linked to "employee" diagram 2502 and "chief_executive diagram 2507, both of which are source data element diagrams. Thus, the software development tool adds the group definition "%xmlModelGroup1" as an attribute for "employee" data element 2404, and for "chief_executive" data element 2418 in the DTD file as shown in FIG. 24. The software development tool then continues processing at step 2626 to identify each group symbol in XML structure diagram 2500 in FIG. 25 to complete the generation of the corresponding DTD file.

While various embodiments of the present invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A computerized method in a data processing system, the method comprising the steps of:

receiving a request to automatically generate a data model from a data definition file containing a data structure with a plurality of data elements, each data element having a name and a definition;

generating a diagram for each data element, the diagrams having names corresponding to the data elements;

determining whether an attribute in the data structure is associated with one of the data elements;

when it is determined that an attribute in the data structure is associated with one of the data elements, displaying a graphical representation of the attribute with the diagram corresponding to the one data element;

synchronizing a textual representation with the graphical representation so that a modification in one representation is automatically visible in the other representation;

determining whether the data structure includes a reference between two of the data elements;

when it is determined that the data structure includes a reference between two elements,
  displaying a reference link from the diagram associated with a first of the two elements to the diagram associated with a second of the two elements;
determining whether the data structure includes a group attribute identifying at least one of to data elements as group attribute member;
when it is determined that the data structure includes a group attribute,
  displaying a group symbol;
  displaying a first link between the group symbol and the diagram that is associated with the identified at least one data element; and
    displaying a second link between the group symbol and the diagram of the data element having the associated group attribute.

2. The method of claim 1, wherein the data model is an XML structure diagram.

3. The method of claim 1, wherein the data definition file is a Document Type Definition file.

4. The method of claim 1, wherein the data definition file is an XML schema file.

5. The method of claim 1, wherein the step of determining whether the data structure includes a reference between two of the data elements comprises the step of determining whether the name of the second element is within the definition of the first data element.

6. The method of claim 1, wherein the step of displaying the second link further comprises the step of determining whether the data element has the associated group attribute.

7. The method of claim 6, wherein the step of determining whether the data element has the associated group attribute comprises the step of determining whether the group attribute is within the definition of the data element.

8. The method of claim 1, further comprising the step of storing information used to generate the data model in a graphical view file.

9. A computerized method in a data processing system, the method comprising the steps of:
  receiving a request to automatically generate a data definition file from a graphical representation having a plurality of data element diagrams, each data element diagram having a name;
  synchronizing a textual representation with the graphical representation so that a modification in one representation is automatically visible in the other representation;
  adding a data element identifier in the data definition file for each data element diagram in the graphical representation;
  adding the name of each data element diagram to the corresponding data element identifier;
  determining whether an attribute is associated with one of the data element diagrams;
  when it is determined that an attribute is associated with one of the data element diagrams,
  adding the attribute to the data element identifier for the one data element diagram;
  determining whether the graphical representation has a reference link between two of the data element diagrams;
  when it is determined that the graphical representation has a reference link between two data element diagrams,
    adding a reference to the data element identifier corresponding to one of the two data element diagrams to reflect a link between the two data element diagrams;
  determining whether the graphical representation has a group symbol;
  when it is determined that the graphical representation has a group symbol,
  determining whether the group symbol is a destination in a first link with a first of the data element diagrams;
  when it is determined that the group symbol is a destination in a first link with a first of the data element diagrams,
    adding a group definition to the data definition file that includes the name of the first data element diagram;
  determining whether the group symbol is a source in a second link with a second of the data element diagrams; and
  when it is determined that the group symbol is a source in a second link with a second of the data element diagrams,
    adding to the data element identifier corresponding to the second element diagram a reference corresponding to the group definition.

10. The method of claim 9, wherein the graphical representation corresponds to an XML structure diagram.

11. The method of claim 9, wherein the data definition file corresponds to a Document Type Definition file.

12. The method of claim 9, wherein the data definition file corresponds to an XML schema file.

13. The method of claim 9, wherein the step of adding a reference to the data element identifier comprises the steps of:
  identifying one of two data element diagrams as a source of the reference link and the other as a destination of the reference link; and
  adding the name of the destination to the data element identifier corresponding to the source.

14. A computer-readable storage medium containing software instructions for controlling a data processing system to perform a method, the method comprising the steps of:
  receiving a request to automatically generate a data model from a data definition file containing a data structure with a plurality of data elements, each data element having a name and a definition;
  generating a diagram for each data element, the diagrams having names corresponding to the data elements;
  determining whether an attribute in the data structure is associated with one of the data elements;
  when it is determined that an attribute in the data structure is associated with one of the data elements,
  displaying a graphical representation of the attribute with the diagram corresponding to the one data element;
  synchronizing a textual representation with the graphical representation so that a modification in one representation is automatically visible in the other representation;
  determining whether the data structure includes a reference between two of the data elements;
  when it is determined that the data structure includes a reference between two elements,
    displaying a reference link from the diagram associated with a first of the two elements to the diagram associated with a second of the two elements;
  determining whether the data structure includes a group attribute identifying at least one of the data elements as group attribute member;
  when it is determined that the data structure includes a group attribute,
    displaying a group symbol;

displaying a first link between the group symbol and the diagram that is associated with the identified at least one data element; and displaying a second link between the group symbol and the diagram of the data element having the associated group attribute.

15. The computer-readable storage medium of claim 14, wherein the data model is an XML structure diagram.

16. The computer-readable storage medium of claim 14, wherein the data definition file is a Document Type Definition file.

17. The computer-readable storage medium of claim 14, wherein the data definition file is an XML schema file.

18. The computer-readable storage medium of claim 14, wherein the step of determining whether the data structure includes a reference between two of the data elements comprises the step of determining whether the name of the second element is within the definition of the first data element.

19. The computer-readable storage medium of claim 14, wherein the step of displaying the second link further comprises the step of determining whether the data element has the associated group attribute.

20. The computer-readable storage medium of claim 19, wherein the step of determining whether the data element has the associated group attribute comprises the step of determining whether the group attribute is within the definition of the data element.

21. The computer-readable storage medium of claim 14, wherein the method further comprises the step of storing information used to generate the data model in a graphical view file.

22. A computer-readable storage medium containing software instructions for controlling a data processing system to perform a method, the method comprising the steps of:

receiving a request to automatically generate a data definition file from a graphical representation having a plurality of data element diagrams, each data element diagram having a name;

synchronizing a textual representation with the graphical representation so that a modification in one representation is automatically visible in the other representation;

adding a data element identifier in the data definition file for each data element diagram to the graphical representation;

adding the name of each data element diagram to the corresponding data element identifier;

determining whether an attribute is associated with one of the data element diagrams;

when it is determined that an attribute is associated with one of the data element diagrams, adding the attribute to the data element identifier for the one data element diagram;

determining whether the graphical representation has a reference link between two of the data element diagrams;

when it is determined that, the graphical representation has a reference link between two data element diagrams, adding a reference to the data element identifier corresponding to one of the two data element diagrams to reflect a link between the two data element diagrams;

determining whether the graphical representation has a group symbol;

when it is determined that the graphical representation has a group symbol, determining whether the group symbol is a destination in a first link with a first of the data element diagrams;

when it is determined that the group symbol is a destination in a first link with a first of the data element diagrams, adding a group definition to the data definition file that includes the name of the first data element diagram;

determining whether the group symbol is a source in a second link with a second of the data element diagrams; and when it is determined that the group symbol is a source in a second link with a second of the data element diagrams, adding to the data element identifier corresponding to the second element diagram a reference corresponding to the group definition.

23. The computer-readable storage medium of claim 22, wherein the graphical representation corresponds to an XML structure diagram.

24. The computer-readable storage medium of claim 22, wherein the data definition file corresponds to a Document Type Definition file.

25. The computer-readable storage medium of claim 22, wherein the data definition file corresponds to an XML schema file.

26. The computer-readable storage medium of claim 22, wherein the step of adding a reference to the data element identifier comprises the steps of:

identifying one of two data element diagrams as a source of the reference link and the other as a destination of the reference link; and adding the name of the destination to the data element identifier corresponding to the source.

27. A data processing system comprising:

a secondary storage device comprising a first data definition file having first data elements and relationships between the first data elements;

a memory device further comprising a program that receives a first request to display a first graphical representation of the first data definition file such that the first graphical representation has first data element diagrams and relationships between the first data element diagrams reflecting the first data elements and the relationships between the first data elements contained in the first data definition file, that displays the first graphical representation responsive to receiving the first request that displays a second graphical representation having second data element diagrams and relationships between the second data element diagrams, that receives a second request to automatically generate a second data definition file from the second graphical representation such that the second data definition file has second data elements and relationships between the second data elements reflecting the second data element diagrams and the relationships between the second data element diagrams of the second graphical representation, and that automatically generates the second data definition file responsive to receiving the second request; that synchronizes a textual representation with the graphical representations so that a modification in each representation is automatically visible in the other representation; and a processor for running the program.

28. The data processing system of claim 27, wherein the first data definition, file corresponds to a Document Type Definition file.

29. The data processing system of claim 27, wherein the second data definition file corresponds to a Document Type Definition file.

30. The data processing system of claim 27, wherein the program further stores the second graphical representation in a second graphical view file on the secondary storage device.

31. The data processing system of claim 27, wherein the program further stores the second data definition file on the secondary storage device.

32. The data processing system of claim 27, wherein the secondary storage device further comprises an XML data structure module that includes XML constructs corresponding to a Document Type Definition specification.

33. The data processing system of claim 32, wherein the program uses the XML constructs to add the plurality of data element identifiers to the first data definition file and to parse the plurality of data elements contained in the second data definition file.

* * * * *